(12) United States Patent
Strehlau et al.

(10) Patent No.: US 9,121,358 B2
(45) Date of Patent: Sep. 1, 2015

(54) USING CAMSHAFT TIMING DEVICE WITH HYDRAULIC LOCK IN AN INTERMEDIATE POSITION FOR VEHICLE RESTARTS

(71) Applicant: BorgWarner Inc., Auburn Hills, MI (US)

(72) Inventors: Anna Strehlau, Windsor (CA); David H. Kaitschuck, Commerce Township, MI (US); Franklin R. Smith, Cortland, NY (US)

(73) Assignee: BorgWarner Inc., Auburn Hills, MI (US)

(*) Notice: Subject to any disclaimer, the term of this patent is extended or adjusted under 35 U.S.C. 154(b) by 353 days.

(21) Appl. No.: 13/773,982

(22) Filed: Feb. 22, 2013

(65) Prior Publication Data

US 2014/0244141 A1    Aug. 28, 2014

(51) Int. Cl.
*F02D 41/06* (2006.01)
*F02D 13/02* (2006.01)
(Continued)

(52) U.S. Cl.
CPC ............. *F02D 41/062* (2013.01); *F01L 1/3442* (2013.01); *F01L 1/34409* (2013.01); *F02D 13/0234* (2013.01); *F02D 13/0238* (2013.01); *F02D 41/042* (2013.01); *F02D 41/06* (2013.01); *F02D 41/064* (2013.01); *F02N 11/0829* (2013.01); *F01L 2001/34423* (2013.01); *F01L 2001/34426* (2013.01);
(Continued)

(58) Field of Classification Search
CPC ..... F02D 41/06; F02D 41/062; F02D 41/064; F02D 41/065; F02D 13/0234; F02D 13/0238

USPC ............... 701/113, 112, 102, 101; 123/179.3, 123/179.4, 179.18, 90.15, 90.16, 90.17, 123/90.31
See application file for complete search history.

(56) References Cited

U.S. PATENT DOCUMENTS

| | | | |
|---|---|---|---|
| 4,627,825 | A | 12/1986 | Bruss et al. |
| 4,858,572 | A | 8/1989 | Shirai et al. |

(Continued)

FOREIGN PATENT DOCUMENTS

| | | | |
|---|---|---|---|
| CN | 1495344 A | 5/2004 | |
| CN | 1755066 A | 4/2006 | |

(Continued)

OTHER PUBLICATIONS

International Search Report for PCT/US2014/015492 mailed Nov. 19, 2014; 10 pgs.

(Continued)

*Primary Examiner* — Mahmoud Gimie
(74) *Attorney, Agent, or Firm* — Brown & Michaels, PC

(57) ABSTRACT

A method of using a mid-position lock VCT phaser in an engine with a stop-start mode of operation with the steps of: when the engine is in a stop mode of the stop-start mode: adjusting a duty cycle of an actuator coupled to the control valve of the phaser to command the control valve to the retard mode; maintaining the duty cycle of the actuator to command the control valve to remain in the retard mode until an automatic restart of the engine. If the key is detected in an off position either restarting the engine; commanding the phaser to the detent mode, such that the lock pin is moved to a locked position and the phaser is locked in an intermediate phase angle position; and shutting down the engine or commanding the phaser to detent mode during engine cranking during a next engine restart.

29 Claims, 20 Drawing Sheets

(51) Int. Cl.
*F02D 41/04* (2006.01)
*F02N 11/08* (2006.01)
*F01L 1/344* (2006.01)
*F02D 41/16* (2006.01)
*F02N 19/00* (2010.01)
*F02D 41/00* (2006.01)

(52) U.S. Cl.
CPC ... *F01L 2001/34453* (2013.01); *F01L 2800/00* (2013.01); *F01L 2800/01* (2013.01); *F01L 2800/03* (2013.01); *F02D 41/065* (2013.01); *F02D 2013/0292* (2013.01); *F02D 2041/001* (2013.01); *F02D 2200/60* (2013.01); *F02N 19/004* (2013.01); *Y02T 10/48* (2013.01)

(56) References Cited

U.S. PATENT DOCUMENTS

| | | | |
|---|---|---|---|
| 5,002,023 A | 3/1991 | Butterfield et al. | |
| 5,107,804 A | 4/1992 | Becker et al. | |
| 5,497,738 A | 3/1996 | Siemon et al. | |
| 5,657,725 A | 8/1997 | Butterfield et al. | |
| 5,738,056 A | 4/1998 | Mikame et al. | |
| 5,797,361 A | 8/1998 | Mikame et al. | |
| 5,924,395 A | 7/1999 | Moriya et al. | |
| 6,170,448 B1 | 1/2001 | Asakura | |
| 6,311,655 B1 | 11/2001 | Simpson et al. | |
| 6,374,787 B2 | 4/2002 | Simpson et al. | |
| 6,453,856 B1 | 9/2002 | Lehmann et al. | |
| 6,453,859 B1 | 9/2002 | Smith et al. | |
| 6,481,402 B1 | 11/2002 | Simpson et al. | |
| 6,505,586 B1 * | 1/2003 | Sato et al. | 123/90.17 |
| 6,526,930 B2 | 3/2003 | Takahashi et al. | |
| 6,666,181 B2 | 12/2003 | Smith et al. | |
| 6,684,835 B2 | 2/2004 | Komazawa et al. | |
| 6,745,735 B2 | 6/2004 | Smith | |
| 6,763,791 B2 | 7/2004 | Gardner et al. | |
| 6,814,038 B2 | 11/2004 | Smith | |
| 6,941,913 B2 | 9/2005 | Smith | |
| 7,000,580 B1 | 2/2006 | Smith et al. | |
| 7,137,371 B2 | 11/2006 | Simpson et al. | |
| 7,240,651 B1 | 7/2007 | Hanshaw | |
| 7,270,096 B2 | 9/2007 | Lancefield et al. | |
| 7,444,964 B2 * | 11/2008 | Kanada et al. | 123/90.15 |
| 7,444,968 B2 | 11/2008 | Lancefield et al. | |
| 7,527,028 B2 | 5/2009 | Leone | |
| 7,669,566 B2 | 3/2010 | Methley | |
| 7,765,955 B2 | 8/2010 | Brooks et al. | |
| 7,765,966 B2 | 8/2010 | Leone | |
| 7,934,479 B2 | 5/2011 | Strauss | |
| 7,946,266 B2 | 5/2011 | Knecht et al. | |
| 8,011,337 B2 | 9/2011 | Hayashi | |
| 8,028,667 B2 | 10/2011 | Hayashi | |
| 8,069,829 B2 | 12/2011 | Leone | |
| 8,356,583 B2 | 1/2013 | Smith | |
| 8,820,280 B2 * | 9/2014 | Smith | 123/90.15 |
| 2002/0043230 A1 | 4/2002 | Kinugawa | |
| 2005/0103297 A1 | 5/2005 | Simpson | |
| 2005/0229880 A1 | 10/2005 | Hashizume | |
| 2007/0028874 A1 | 2/2007 | Simpson | |
| 2010/0251981 A1 * | 10/2010 | McCloy et al. | 123/90.17 |
| 2012/0145098 A1 | 6/2012 | Crowe et al. | |
| 2013/0008399 A1 | 1/2013 | Busse et al. | |

FOREIGN PATENT DOCUMENTS

| | | |
|---|---|---|
| CN | 101046165 A | 10/2007 |
| GB | 2278661 A | 12/1994 |
| GB | 2437305 | 10/2007 |
| GB | 2432645 B | 12/2010 |
| JP | 02149707 A | 6/1990 |
| JP | 09280017 A | 10/1997 |
| JP | 11-210424 | 8/1999 |
| JP | 2001-098910 | 4/2001 |
| WO | 2009114500 A1 | 9/2009 |
| WO | 2012047748 A2 | 4/2012 |

OTHER PUBLICATIONS

International Search Report for PCT/US2009/036611 mailed Aug. 20, 2009; 10 pgs.

Staub, A. et al.; Quo vadis hydraulic variable camshaft phasing unit?; 2010; pp. 215-225.

International Search Report for PCT/US2011/054196 mailed May 7, 2012; 9 pgs.

Miura, T. et al.; "Development of a Hydraulic Variable Valve Timing Control System with an Optimum Angular Position Locking Mechansim"; SAE International; 2012; 14 pages.

* cited by examiner

USING CAMSHAFT TIMING DEVICE WITH HYDRAULIC LOCK IN AN INTERMEDIATE POSITION FOR VEHICLE RESTARTS

BACKGROUND OF THE INVENTION

1. Field of the Invention

The invention pertains to the field of variable cam timing. More particularly, the invention pertains to a method of using a variable camshaft timing device with a hydraulic lock in an intermediate position for automatic restarts of a stop start mode of an engine and cold restarts of the vehicle.

2. Description of Related Art

By reducing the idling time of an internal combustion engine in a vehicle, the fuel efficiency is increased and emissions are reduced. Therefore, vehicles can use a "stop-start mode" which automatically stops and automatically restarts the internal combustion engine to reduce the amount of time the engine spends idling when the vehicle is stopped, for example at a stop light or in traffic. This stopping of the engine is different than a "key-off" position or manual stop via deactivation of the ignition switch in which the user of the vehicle shuts the engine down or puts the car in park and shuts the vehicle off. In "stop-start mode", the engine stops as the vehicle is stopped, then automatically restarts in a manner that is nearly undetectable to the user of the vehicle. In the past, vehicles have been designed primarily with cold starts in mind, since that is the most common situation. In a stop-start system, because the engine had been running until the automatic shutdown, the automatic restart occurs when the engine is in a hot state. It has long been known that "hot starts" are sometimes a problem because the engine settings necessary for the usual cold start—for example, a particular valve timing position—are inappropriate to a warm engine.

Most engines with a phaser place the phaser in the retard position on engine shutdown using a lock pin or a series of lock pins, in preparation for the next start.

As an example, U.S. Pat. No. 5,924,395 is a patent for variable cam timing in a stop-start engine control system. When a stop signal is detected by the ECU, the intake valves are changed to the most retarded position in preparation for an upcoming hot start. In one embodiment in the '395 patent, a lock pin fixes the vane of the phaser in the most retarded position by inserting a lock pin into a retard-side engagement hole.

SUMMARY OF THE INVENTION

A method of using a mid-position lock variable cam timing phaser in an internal combustion engine with a stop-start mode of operation with the steps of: when the engine is in a stop mode of the stop-start mode: adjusting a duty cycle of an actuator coupled to the control valve of the phaser to command the control valve to the retard mode; maintaining the duty cycle of the actuator to command the control valve to remain in the retard mode until an automatic restart of the engine. If the key is detected in an off position, and if the key is in an off position, restarting the engine; commanding the phaser to the detent mode, such that the lock pin is moved to a locked position and the phaser is locked in an intermediate phase angle position; and shutting down the engine.

Alternatively, if the key is detected in an off position, and if the key is in an off position, commanding the phaser to detent mode during engine cranking during a next engine restart, such that the lock pin is moved to a locked position and the phaser is locked in an intermediate phase angle position.

BRIEF DESCRIPTION OF THE DRAWING

FIG. 8 shows the phaser moving towards the intermediate phase angle position with the retard detent line in fluid communication with the retard chamber and the hydraulic detent circuit on.

FIG. 9 shows the phaser moving towards the intermediate phase angle position with the advance detent line in fluid communication with the advance chamber and the hydraulic detent circuit on.

DETAILED DESCRIPTION OF THE INVENTION

Figure 1:
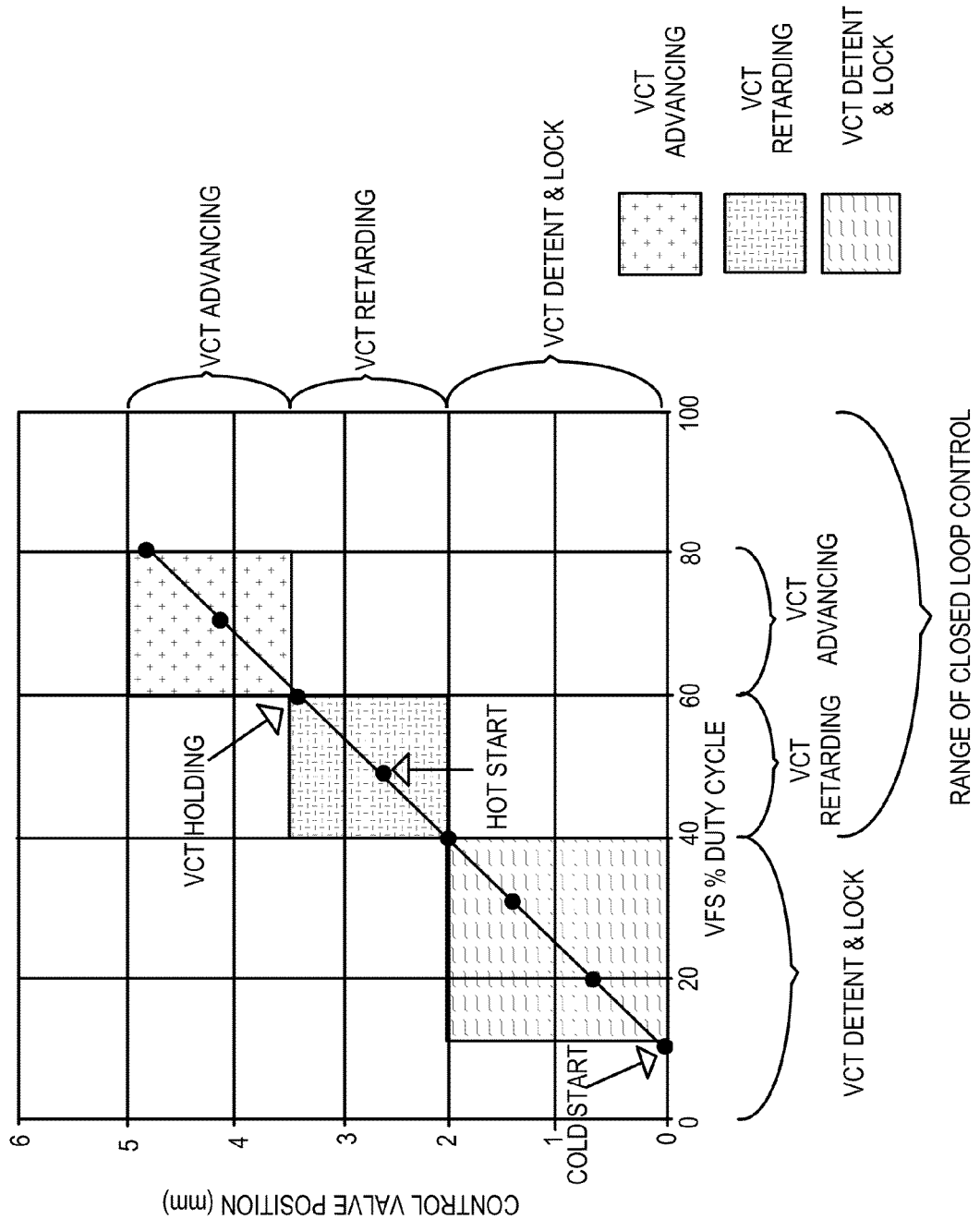
FIG. 1 shows a graph of control valve position versus variable force solenoid duty cycle relative to the position of the phaser for cold starts, hot starts, and holding of the phaser.

The present invention uses a phaser which has an offset or remote piloted valve added to the hydraulic circuit to manage a hydraulic detent switching function, in order to provide a mid-position lock for cold starts of the engine, either during cranking or prior to complete engine shutdown. The mid-position locking of the phaser positions the cam at an optimum position for cold restarts of the engine once a current signal has been removed from the actuator, or variable force solenoid. The present invention also discloses a method for maintaining the phaser in a full retard position during an automatic "stop" of the engine in stop-start mode.

The piloted valve may be controlled on/off with the same hydraulic circuit that engages or releases the lock pin. This shortens the variable cam timing (VCT) control valve to two hydraulic circuits, a VCT control circuit and a combined lock pin/hydraulic detent control circuit. Movement of the piloted valve to the first position is actively controlled by the remote on/off valve or the control valve of the phaser.

Alternatively, a lock pin is not present and the piloted valve is controlled by a hydraulic valve means or by supply pressure through the control valve of the phaser.

One of the advantages to using the remote piloted valve is that it can have a longer stroke than the control valve, since it is not limited by a solenoid. Therefore, the piloted valve can open up a larger flow passage for the hydraulic detent mode and improve actuation rate in the detent mode. In addition, the location of the remote piloted valve shortens and simplifies the hydraulic detent circuit and thereby increases performance of the VCT detent mode or intermediate phase angle position of the phaser.

FIGS. 4-13 show the operating modes the VCT phaser depending on the spool valve position. The positions shown in the figures define the direction the VCT phaser is moving to. It is understood that the phase control valve has an infinite number of intermediate positions, so that the control valve not only controls the direction the VCT phaser moves but, depending on the discrete spool position, controls the rate at which the VCT phaser changes positions. Therefore, it is understood that the phase control valve can also operate in infinite intermediate positions and is not limited to the positions shown in the Figures.

Internal combustion engines have employed various mechanisms to vary the angle between the camshaft and the crankshaft for improved engine performance or reduced emissions. The majority of these variable camshaft timing (VCT) mechanisms use one or more "vane phasers" on the engine camshaft (or camshafts, in a multiple-camshaft engine). In most cases, the phasers have a rotor 105 with one or more vanes 104, mounted to the end of the camshaft 126, surrounded by a housing assembly 100 with the vane chambers into which the vanes fit. It is possible to have the vanes 104 mounted to the housing assembly 100, and the chambers in the rotor assembly 105, as well. The housing's outer circumference 101 forms the sprocket, pulley or gear accepting drive force through a chain, belt, or gears, usually from the crankshaft, or possible from another camshaft in a multiple-cam engine.

Referring to FIGS. 4-13, torque reversals in the camshaft caused by the forces of opening and closing engine valves move the vane 104. The advance and retard chambers 102, 103 are arranged to resist positive and negative torque pulses in the camshaft 126 and are alternatively pressurized by the cam torque. The control valve 109 allows the vane 104 in the phaser to move by permitting fluid flow from the advance chamber 102 to the retard chamber 103 or vice versa, depending on the desired direction of movement.

The housing assembly 100 of the phaser has an outer circumference 101 for accepting drive force. The rotor assembly 105 is connected to the camshaft 126 and is coaxially located within the housing assembly 100. The rotor assembly 105 has a vane 104 separating a chamber formed between the housing assembly 100 and the rotor assembly 105 into an advance chamber 102 and a retard chamber 103. The vane 104 is capable of rotation to shift the relative angular position of the housing assembly 100 and the rotor assembly 105. Additionally, a hydraulic detent circuit 133 and a lock pin circuit 123 are also present. The hydraulic detent circuit 133 and the lock pin circuit 123 are essentially one circuit as discussed above, but will be discussed separately for simplicity. The hydraulic detent circuit 133 includes a spring 131 loaded piloted valve 130 and an advance detent line 128 that connects the advance chamber 102 to the piloted valve 130 and the common line 114, and a retard detent line 134 that connects the retard chamber 103 to the piloted valve 130 and the common line 114. The advance detent line 128 and the retard detent line 134 are a predetermined distance or length from the vane 104. The piloted valve 130 is in the rotor assembly 105 and is fluidly connected to the lock pin circuit 123 and line 119a through line 132. The lock pin circuit 123 includes the lock pin 125, line 132, the piloted valve 130, supply line 119a, and exhaust line 122.

The lock pin 125 is slidably housed in a bore in the rotor assembly 105 and has an end portion that is biased towards and fits into a recess 127 in the housing assembly 100 by a spring 124. Alternatively, the lock pin 125 may be housed in the housing assembly 100 and be spring 124 biased towards a recess 127 in the rotor assembly 105. The opening and closing of the hydraulic detent circuit 133 and pressurization of the lock pin circuit 123 are both controlled by the switching/movement of the phase control valve 109.

A control valve 109, preferably a spool valve, includes a spool 111 with cylindrical lands 111a, 111b, and 111c slidably received in a sleeve 116 within a bore in the rotor 105 and pilots in the camshaft 126. One end of the spool contacts spring 115 and the opposite end of the spool contacts a pulse width modulated variable force solenoid (VFS) 107. The solenoid 107 may also be linearly controlled by varying current or voltage or other methods as applicable. Additionally, the opposite end of the spool 111 may contact and be influenced by a motor, or other actuators.

The position of the control valve 109 is controlled by an engine control unit (ECU) 106 which controls the duty cycle of the variable force solenoid 107. The ECU 106 preferably includes a central processing unit (CPU) which runs various computational processes for controlling the engine, memory, and input and output ports used to exchange data with external devices and sensors.

The position of the spool 111 is influenced by spring 115 and the solenoid 107 controlled by the ECU 106. Further detail regarding control of the phaser is discussed in detail below. The position of the spool 111 controls the motion (e.g. to move towards the advance position, holding position, or the retard position) of the phaser as well as whether the lock pin circuit 123 and the hydraulic detent circuit 133 are open (on) or closed (off). In other words, the position of the spool 111 actively controls the piloted valve. The control valve 109 has an advance mode, a retard mode, a null mode (holding position), and a detent mode.

In the advance mode, the spool 111 is moved to a position so that fluid may flow from the retard chamber 103 through the spool 111 to the advance chamber 102, fluid is blocked from exiting the advance chamber 102, and the detent valve circuit 133 is off or closed. In the retard mode, the spool 111 is moved to a position so that fluid may flow from the advance chamber 102 through the spool 111 to the retard chamber 103, fluid is blocked from exiting the retard chamber 103, and the detent valve circuit 133 is off.

In null mode, the spool 111 is moved to a position that blocks the exit of fluid from the advance and retard chambers 102, 103, and the detent valve circuit 133 is off.

In the detent mode, three functions occur simultaneously. The first function in the detent mode is that the spool 111 moves to a position in which spool land 111*b* blocks the flow of fluid from line 112 in between spool lands 111*a* and 111*b* from entering any of the other lines and line 113, effectively removing control of the phaser from the control valve 109. The second function in detent mode is to open or turn on the detent valve circuit 133. The detent valve circuit 133 has complete control over the phaser moving to advance or retard, until the vane 104 reaches the intermediate phase angle position. The third function in the detent mode is to vent the lock pin circuit 123, allowing the lock pin 125 to engage the recess 127. The intermediate phase angle position or mid position is when the vane 104 is somewhere between the advance wall 102*a* and the retard wall 103*a* defining the chamber between the housing assembly 100 and the rotor assembly 105. The intermediate phase angle position can be anywhere between the advance wall 102*a* and retard wall 103*a* and is determined by where the detent passages 128 and 134 are relative to the vane 104.

Based on the duty cycle of the pulse width modulated variable force solenoid 107, the spool 111 moves to a corresponding position along its stroke. When the duty cycle of the variable force solenoid 107 is approximately 40%, 60% or 80%, the spool 111 will be moved to positions that correspond with the retard mode, the null mode, and the advance mode, respectively and the piloted valve 130 will be pressurized and move to the second position, the hydraulic detent circuit 133 will be closed, and the lock pin 125 will be pressurized and released. When the duty cycle of the variable force solenoid 107 is 0%, the spool 111 is moved to the detent mode such that the piloted valve 130 vents and moves to the second position, the hydraulic detent circuit 133 will be open, and the lock pin 125 vented and engaged with the recess 127. A duty cycle of 0% was chosen as the extreme position along the spool stroke to open the hydraulic detent circuit 133, vent the piloted valve 130, and vent and engage the lock pin 125 with the recess 127, since if power or control is lost, the phaser will default to a locked position. It should be noted that the duty cycle percentages listed above are an example and they may be altered. Furthermore, the hydraulic detent circuit 133 may be open, the piloted valve 130 vented, and the lock pin 125 vented and engaged with the recess 127 at 100% duty cycle, if desired.

FIG. 1 shows a graph of the variable cam timing (VCT) control valve position versus variable force solenoid (VFS) duty cycle with the ideal positions of the phaser for cold starts, hot starts, and holding of the phaser of an engine with stop-start mode. A cold start of an engine is starting the engine when the oil is at a temperature below normal operating temperature of the oil. A hot start or warm start of the engine is restarting the engine when the engine oil is warm, indicating that the engine is sufficiently hot to run normally.

In order for the phaser to be in detent position with the lock pin in a locked position, the duty cycle of the VFS is set to 0%. The lock pin will remain in a locked position as the duty cycle is increased up to 40%. In the example of the figures, the stroke of the spool or position of the spool relative to the sleeve (see the "spool position" scale in FIG. 7A) is between 0 and 2 mm for the detent position.

The detent position is ideal for a cold start of the engine since the phaser is locked with the vane 104 in an intermediate position between a full advance position and a full retard position. The "full advance position" is defined as the position at which the vane 104 contacts the advance wall 102*a*, and the "full retard position" is defined as the vane 104 contacting the retard wall 103*a*. The detent position can also provide an ideal or optimized compression ratio at ignition for starting the engine, for example approximately 8:1. When the phaser in a full retard position, when the ignition fires the spark the compression ratio is too low to start the engine for a cold start, and when the phaser is in an advance position, the compression ratio is too high to start the engine for a cold start.

When the duty cycle of the variable force solenoid 107 is just set to 0%, the force on the VFS on the spool 111 is decreased, and the spring 115 moves the spool 111 to the far left end of the spool's travel to a detent position as shown in the Figures. In this detent position, spool land 111*b* blocks the flow of fluid from line 112 in between spool lands 111*a* and 111*b* from entering any of the other lines and line 113, effectively removing control of the phaser from the control valve 109. At the same time, fluid from supply may flow through line 119 to line 119*b* and inlet check valve 118 to the common line 114. Fluid is prevented from flowing through line 119*a* to the lock pin 125 by spool land 111*c*. Since fluid cannot flow to line 119*a*, the lock pin 125 is no longer pressurized and vents through the spool 111 to exhaust line 122. Similarly, the piloted valve 130 also vents to line 122, opening passage between the advance detent line 128 and the retard detent line 134 through the piloted valve 130 to line 129 and the common line 114, in other words opening the hydraulic detent circuit 133.

Referring to FIGS. 7*a*-13, when the duty cycle of the variable force solenoid 107 is 0%, the spool is in detent mode, the piloted valve 130 is vented, the hydraulic detent circuit 133 is open or on, and the lock pin circuit 123 is off or closed, the lock pin 125 is vented and engages with a recess 127, and the rotor 105 is locked relative to the housing assembly 100 in a mid position or an intermediate phase angle position. Depending on where the vane 104 was prior to the duty cycle of the variable force solenoid 107 being changed to 0%, either the advance detent line 128 or the retard detent line 134 will be exposed to the advance or retard chamber 102, 103 respectively.

In addition, if the engine had an abnormal shut down (e.g. the engine stalled), when the engine is cranking, the duty cycle of the variable force solenoid 107 would be 0%, the rotor assembly 105 would move via the detent circuit 133 to a mid lock position or an intermediate phase angle position and the lock pin 125 would be engaged in mid position or intermediate phase angle position regardless of what position the vane 104 was in relative to the housing assembly 100 prior to the abnormal shut down of the engine.

The ability of the phaser of the present invention to default to a mid position or intermediate phase angle position without using electronic controls allows the phaser to move to the mid position or intermediate phase angle position even during engine cranking when electronic controls are not typically used for controlling the cam phaser position. In addition, since the phaser defaults to the mid position or intermediate phase angle position, it provides a fail safe position, especially if control signals or power or lost, that guarantees that the engine will be able to start and run even without active control over the VCT phaser. Since the phaser has the mid position or intermediate phase angle position upon cranking of the engine, longer travel of the phase of the phaser is possible, providing calibration opportunities. In the prior art, longer travel phasers or a longer phase angle is not possible, since the mid position or intermediate phase angle position is not present upon engine cranking and startup and the engine has difficulty starting at either the extreme advance or retard stops.

If the vane 104 was positioned within the housing assembly 100 near or in the advance position and the advance detent line 128 is exposed to the advance chamber 102, then fluid from the advance chamber 102 will flow into the advance detent line 128 and through the open piloted valve 130 and to line 129 leading to common line 114. From the common line 114, fluid flows through check valve 110 and into the retard chamber 103, moving the vane 104 relative to the housing assembly 100 to close off or block advance detent line 128 to the advance chamber 102. As the rotor assembly 105 closes off the advance detent line 128 from the advance chamber 102, the vane 104 is moved to an intermediate phase angle position or a mid position within the chamber formed between the housing assembly 100 and the rotor assembly 105, and the lock pin 125 aligns with recess 127, locking the rotor assembly 105 relative to the housing assembly 100 in a mid position or an intermediate phase angle position.

If the vane 104 was positioned within the housing assembly 100 near or in the retard position and the retard detent line 134 is exposed to the retard chamber 103, then fluid from the retard chamber 103 will flow into the retard detent line 134 and through the open piloted valve 130 and to line 129 leading to common line 114. From the common line 114, fluid flows through check valve 108 and into the advance chamber 102, moving the vane 104 relative to the housing assembly 100 to close off the retard detent line 134 to the retard chamber 103. As the rotor 105 closes off line the retard detent 134 from the retard chamber 103, the vane 104 is moved to an intermediate phase angle position or a mid position within the chamber formed between the housing assembly 100 and the rotor assembly 105, and the lock pin 125 aligns with the recess 127, locking the rotor 105 relative to the housing assembly 100 in a mid position or an intermediate phase angle position.

The advance detent line 128 and the retard detent line 134 are completely closed off or blocked by the rotor assembly 105 from the advance and retard chambers 102, 103 when phaser is in the mid position or intermediate phase angle position, requiring that the lock pin 125 engages the recess 127 at the precise time in which the advance detent line 128 or the retard detent line 134 are closed off from their respective chambers. Alternatively, the advance detent line 128 and the retard detent line 134 may be slightly open or partially restricted to the advance and retard chambers 102, 103, in the mid position or intermediate phase angle position to allow the rotor assembly 105 to oscillate slightly, increasing the likelihood the lock pin 125 will pass over the position of the recess 127 so the lock pin 125 can engage the recess 127.

When the duty cycle is set between 40-60%, the vane of the phaser is moving toward and/or in a retard position. The stroke of the spool or position of the spool relative to the sleeve is between 2 and 3.5 mm for the retard position.

Having the phaser in a retard position is ideal for a hot or warm restart since a lower compression ratio can be used to restart the engine. By placing the phaser in a full retard position and therefore using a lower compression ratio, the efficiency of the engine restart is increased, the vibration of the engine during the engine restart is minimized, the work load on the starter is minimized, and the time for the engine to restart is accelerated.

Figure 5:
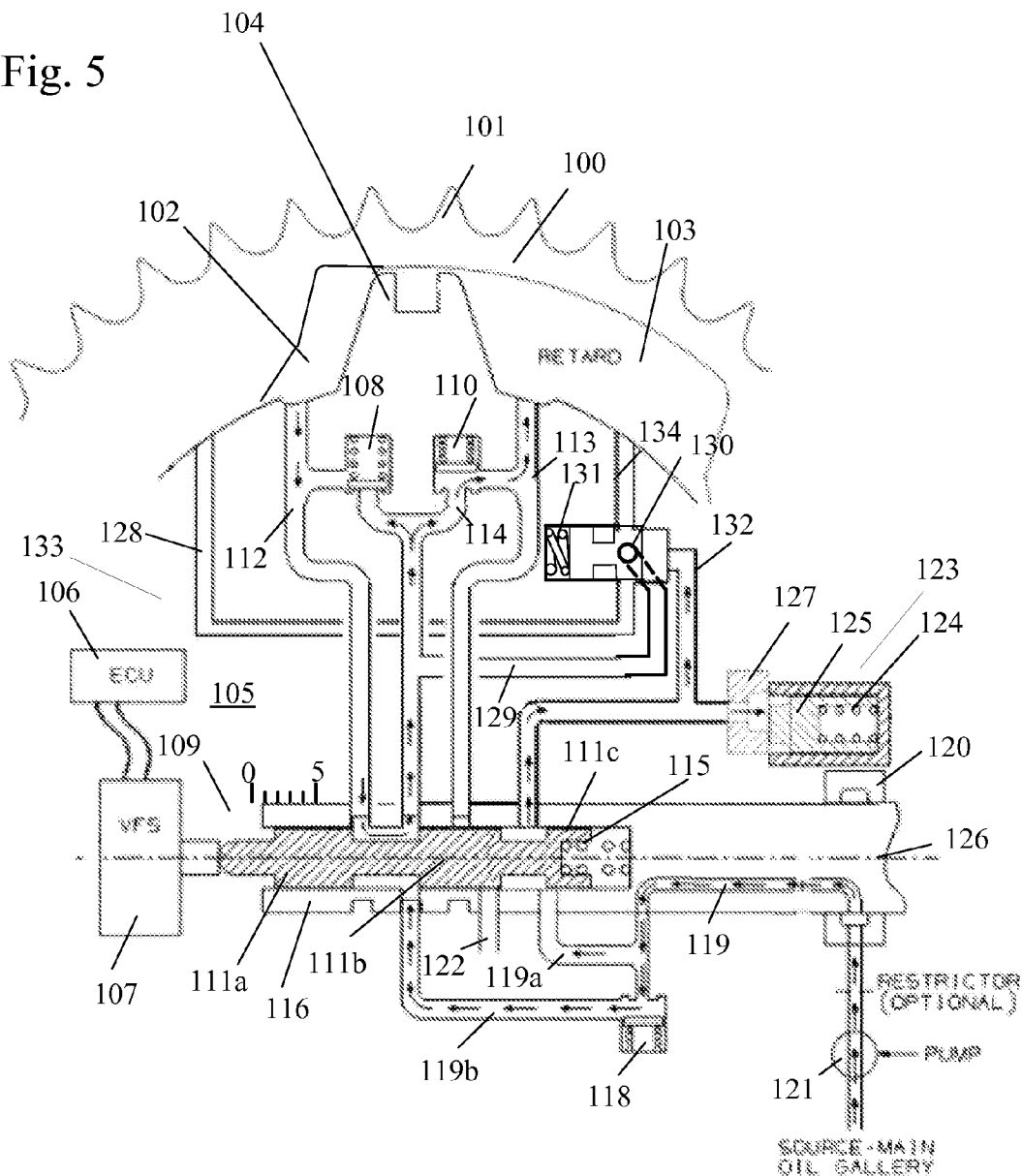
FIG. 5 shows a schematic of a cam torque mid-position lock phaser moving towards a retard position.

Referring to FIG. 5, to move towards the retard position, the duty cycle is adjusted to a range greater than 40% but less than 60%, the force of the VFS 107 on the spool 111 is changed and the spool 111 is moved to the left in a retard mode in the figure by spring 115, until the force of spring 115 balances the force of the VFS 107. In the retard mode shown, spool land 111b blocks line 113 and lines 112 and 114 are open. Camshaft torque pressurizes the advance chamber 102, causing fluid in the advance chamber 102 to move into the retard chamber 103, and the vane 104 to move in the direction shown by the arrow. Fluid exits from the advance chamber 102 through line 112 to the control valve 109 between spool lands 111a and 111b and recirculates back to central line 114 and line 113 leading to the retard chamber 103.

Figure 13:
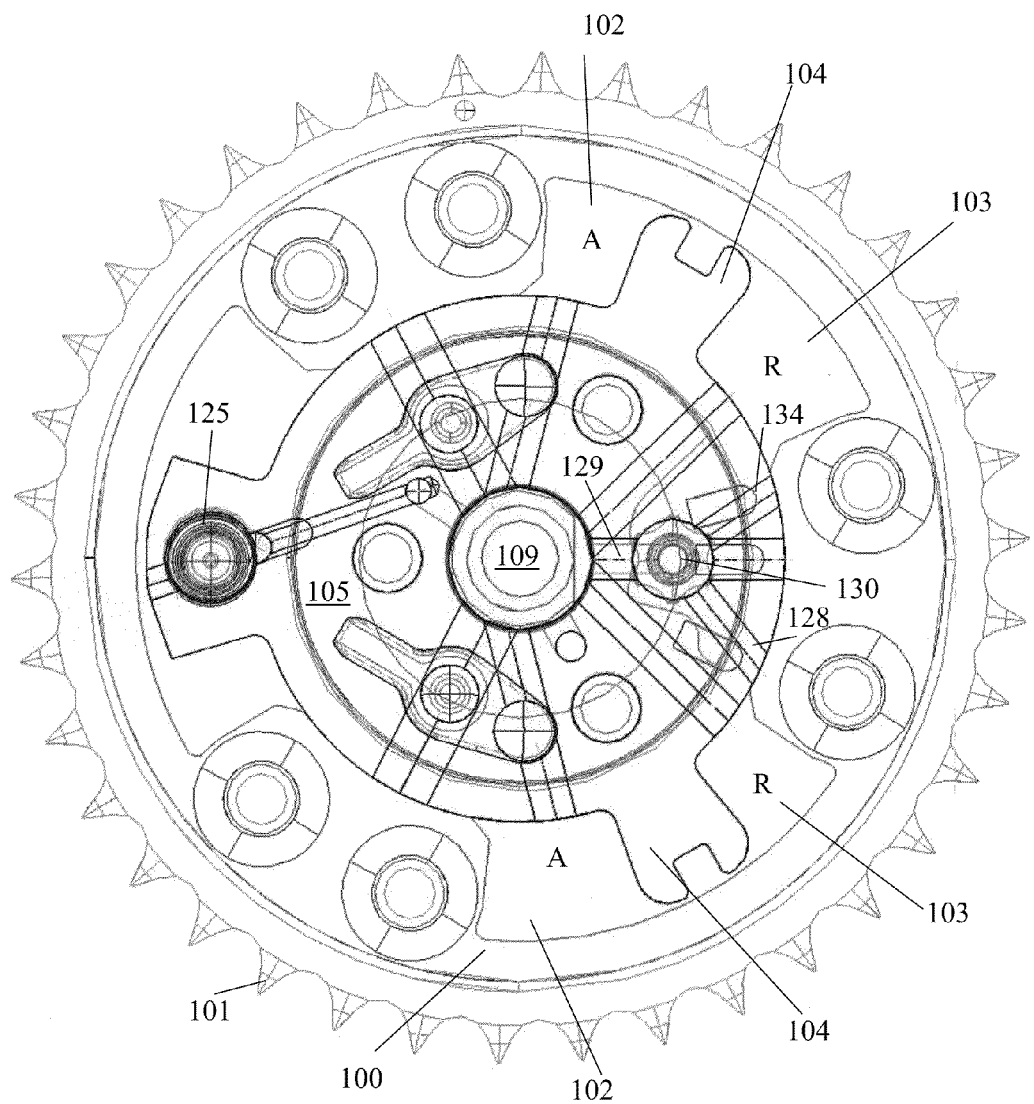
FIG. 13 shows a sectional view of the piloted valve when the phaser is in any of the advanced position, the retard position, or in the holding position with the lock pin in a released position.

Makeup oil is supplied to the phaser from supply S by pump 121 to make up for leakage and enters line 119 through a bearing 120. Line 119 splits into two lines 119a and 119b. Line 119b leads to an inlet check valve 118 and the control valve 109. From the control valve 109, fluid enters line 114 through either of the check valves 108, 110, depending on which is open to the chambers 102, 103. Line 119a leads to the lock pin 125 and branches into line 132 which leads to the piloted valve 130. The pressure of the fluid in line 119a moves through the spool 111 between lands 111b and 111c to bias the lock pin 125 against the spring 124 to a released position, filling the lock pin circuit 123 with fluid. The fluid in line 119a also flows through line 132 and pressurizes the piloted valve 130 against the spring 131, moving the piloted valve 130 to a position where retard detent line 134 and the advance detent line 128 are blocked from line 129 and from each other as shown in FIGS. 5 and 13 and the detent circuit is off. Exhaust line 122 is blocked by spool land 111b, preventing the lock pin 125 and the piloted valve 130 from venting.

The holding position of the phaser preferably takes place between the retard and advance position of the vane relative to the housing. The stroke of the spool or position of the spool relative to the sleeve is 3.5 mm.

Figure 6:
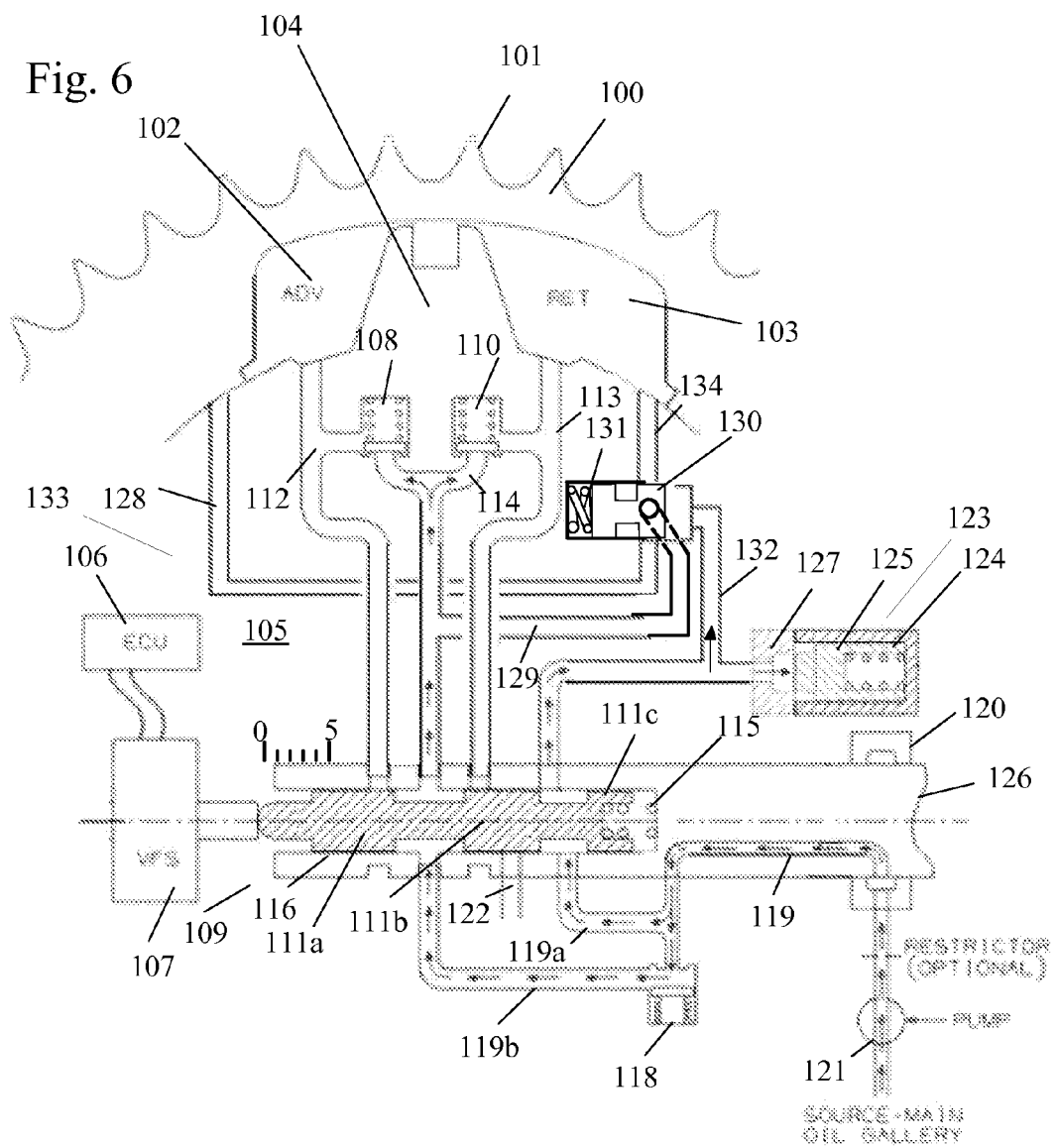
FIG. 6 shows a schematic of a cam torque mid-position lock phaser in a holding position.
Figure 7A:
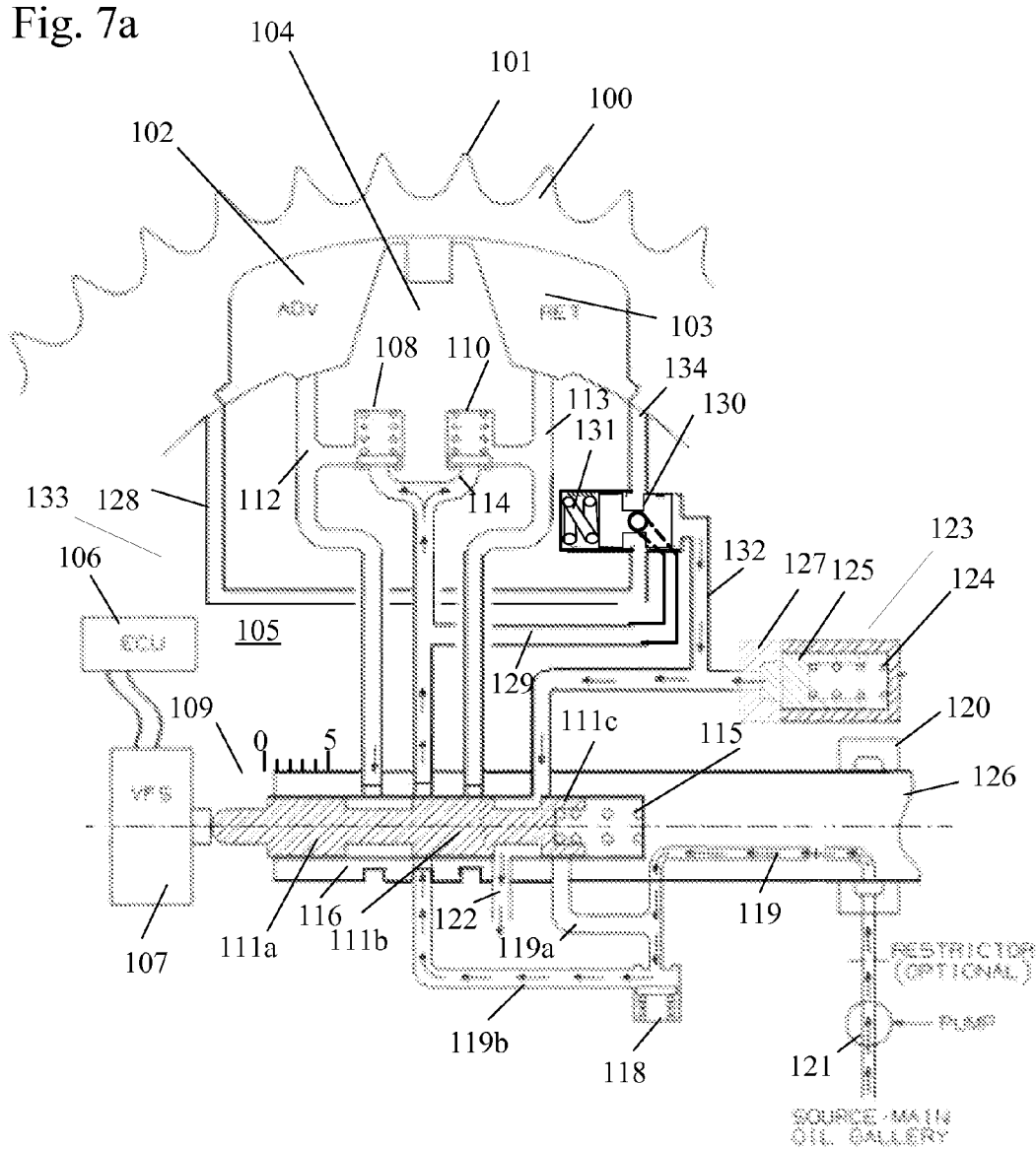
FIG. 7a shows a schematic of the cam torque mid-position lock phaser in the detent position.
Figure 7B:
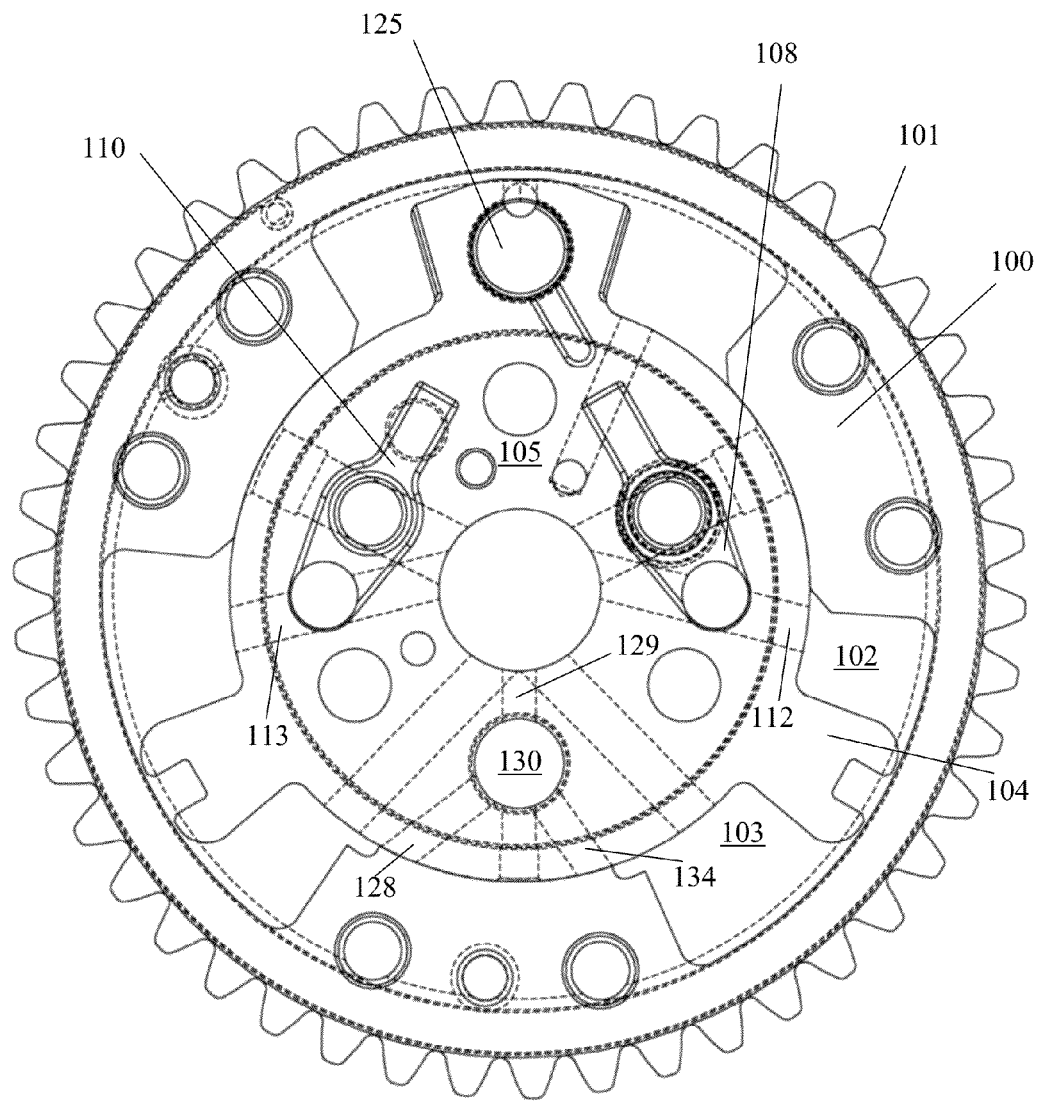
FIG. 7b shows the phaser in detent position.
Figure 8:
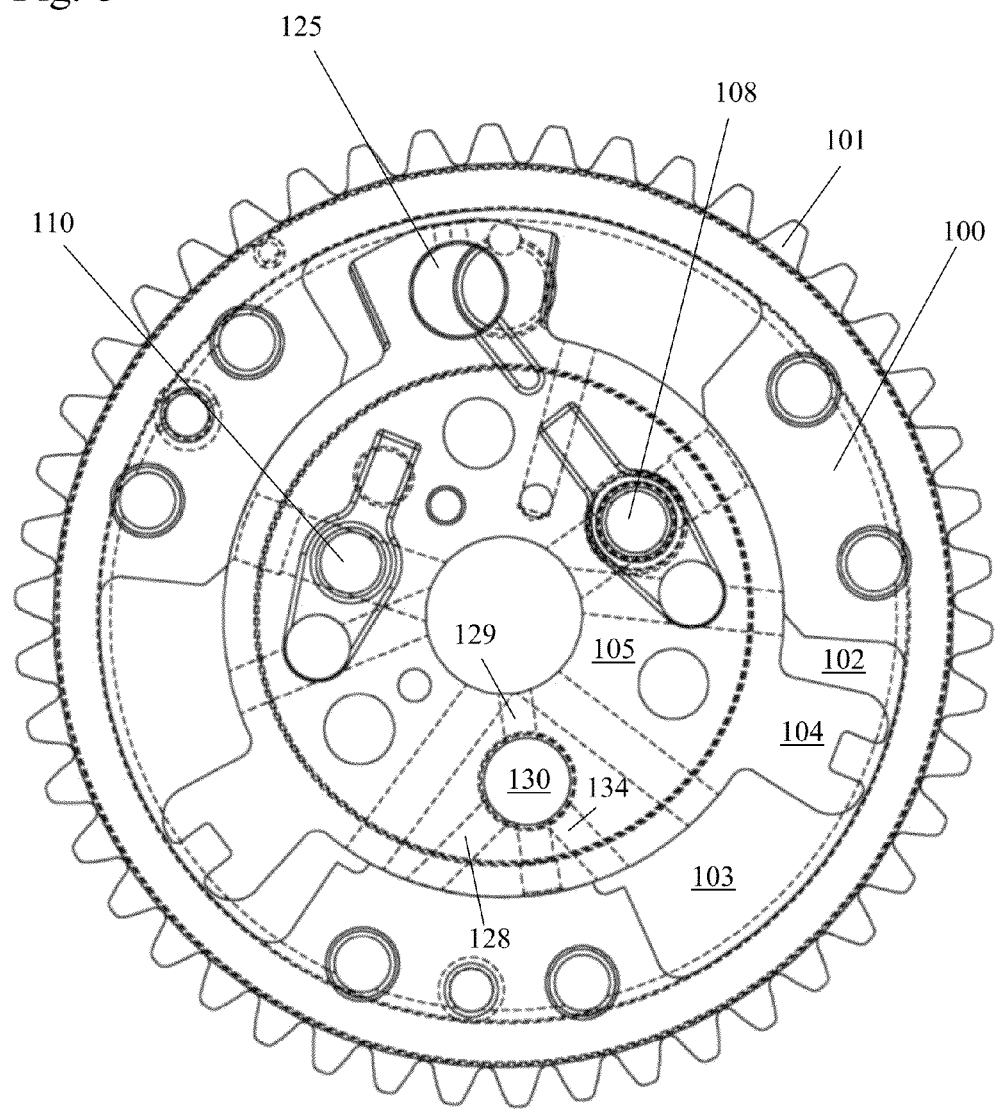
Figure 9:
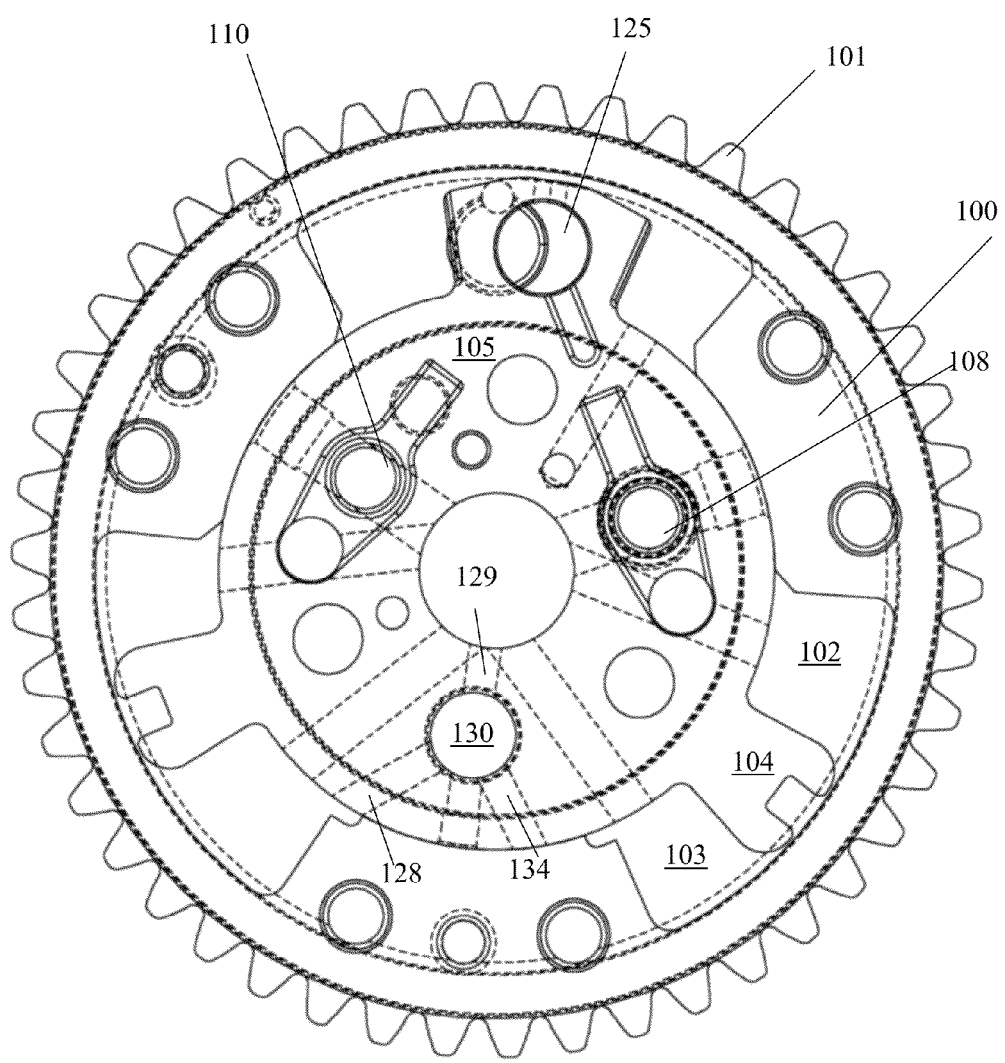
Figure 10A:
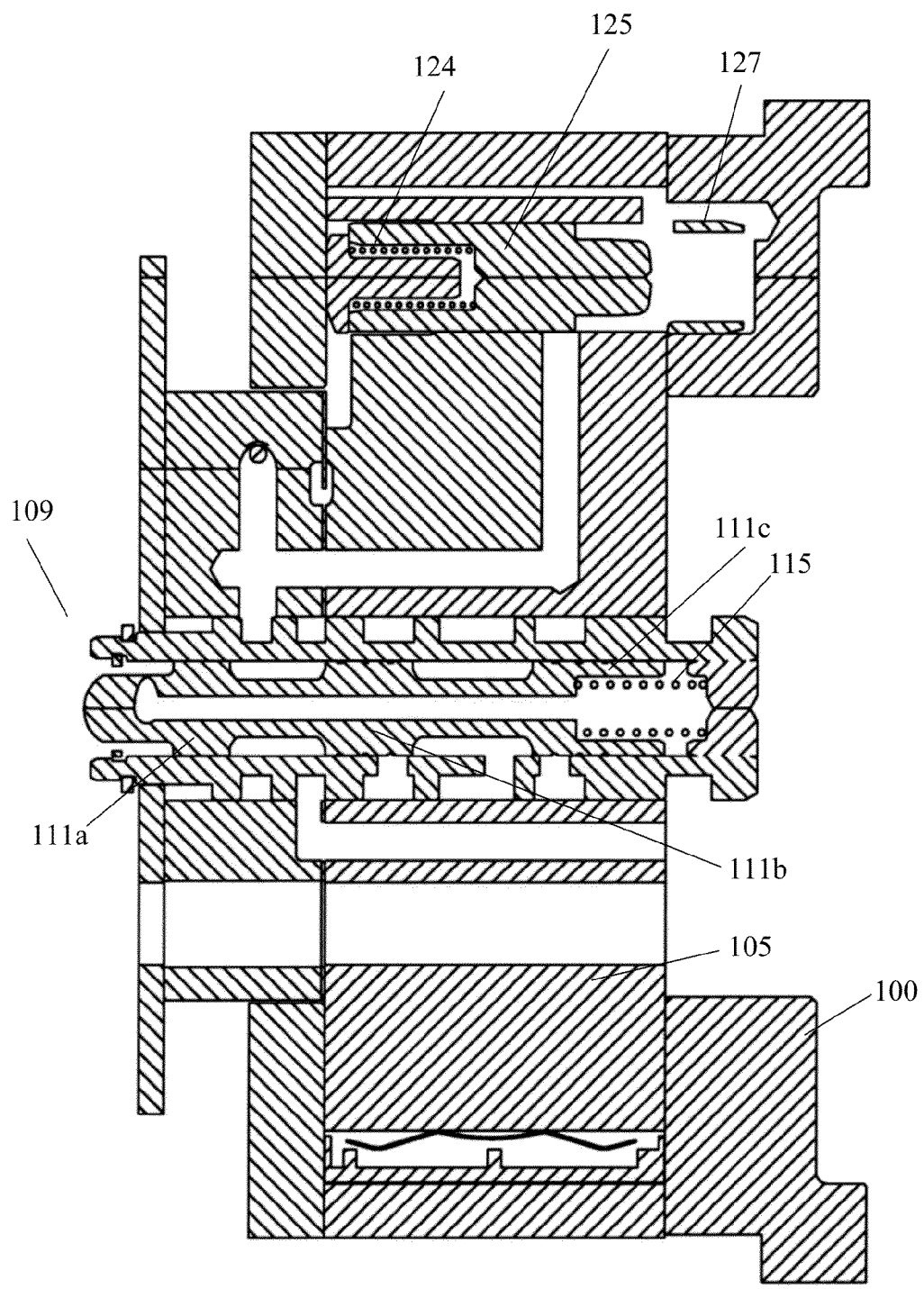
FIG. 10a shows a cross-section of the phaser with the lock pin unlocked.
Figure 10B:
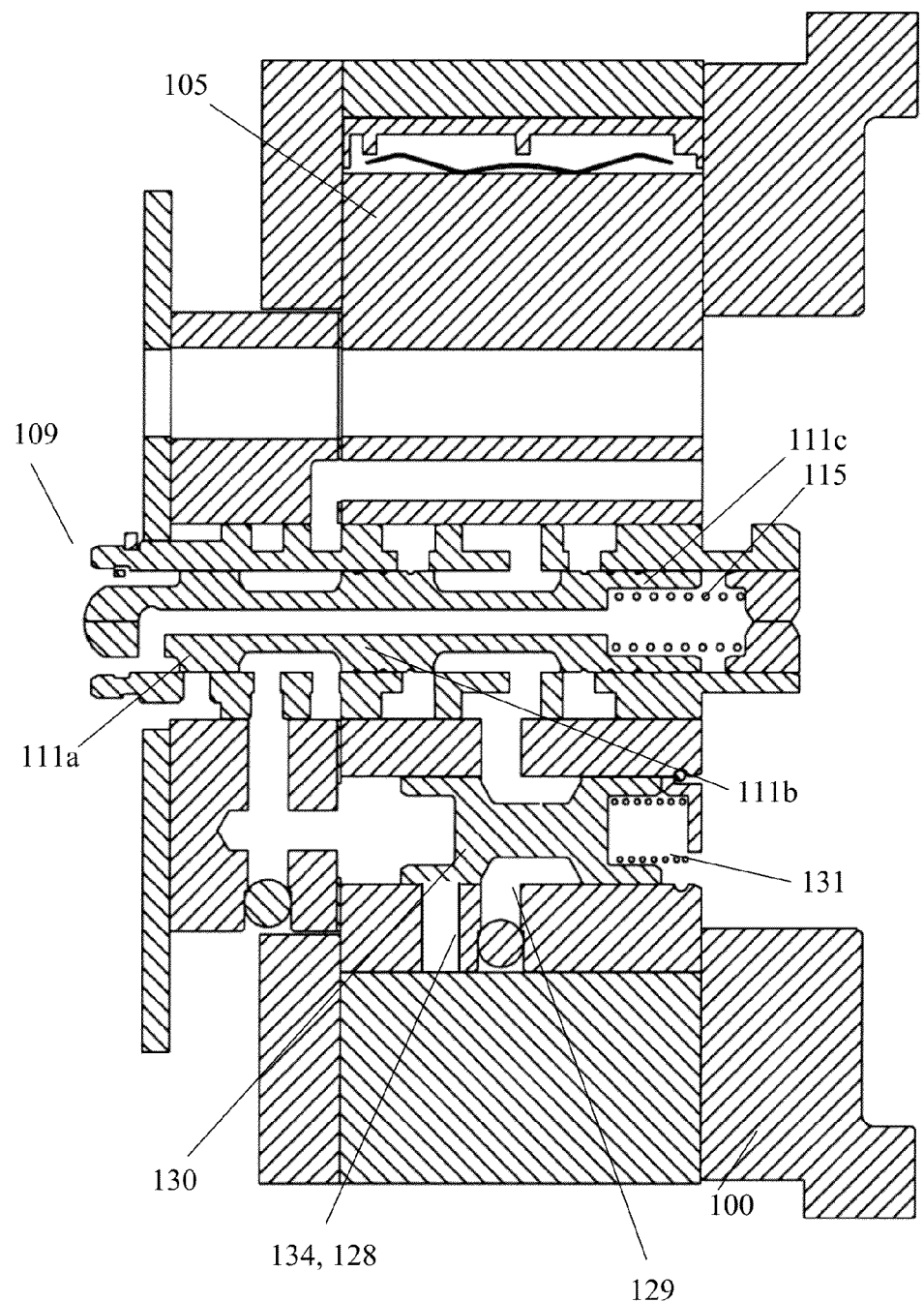
FIG. 10b shows a cross-section of the phaser with the piloted valve in a position such that the hydraulic detent circuit is off.
Figure 11A:
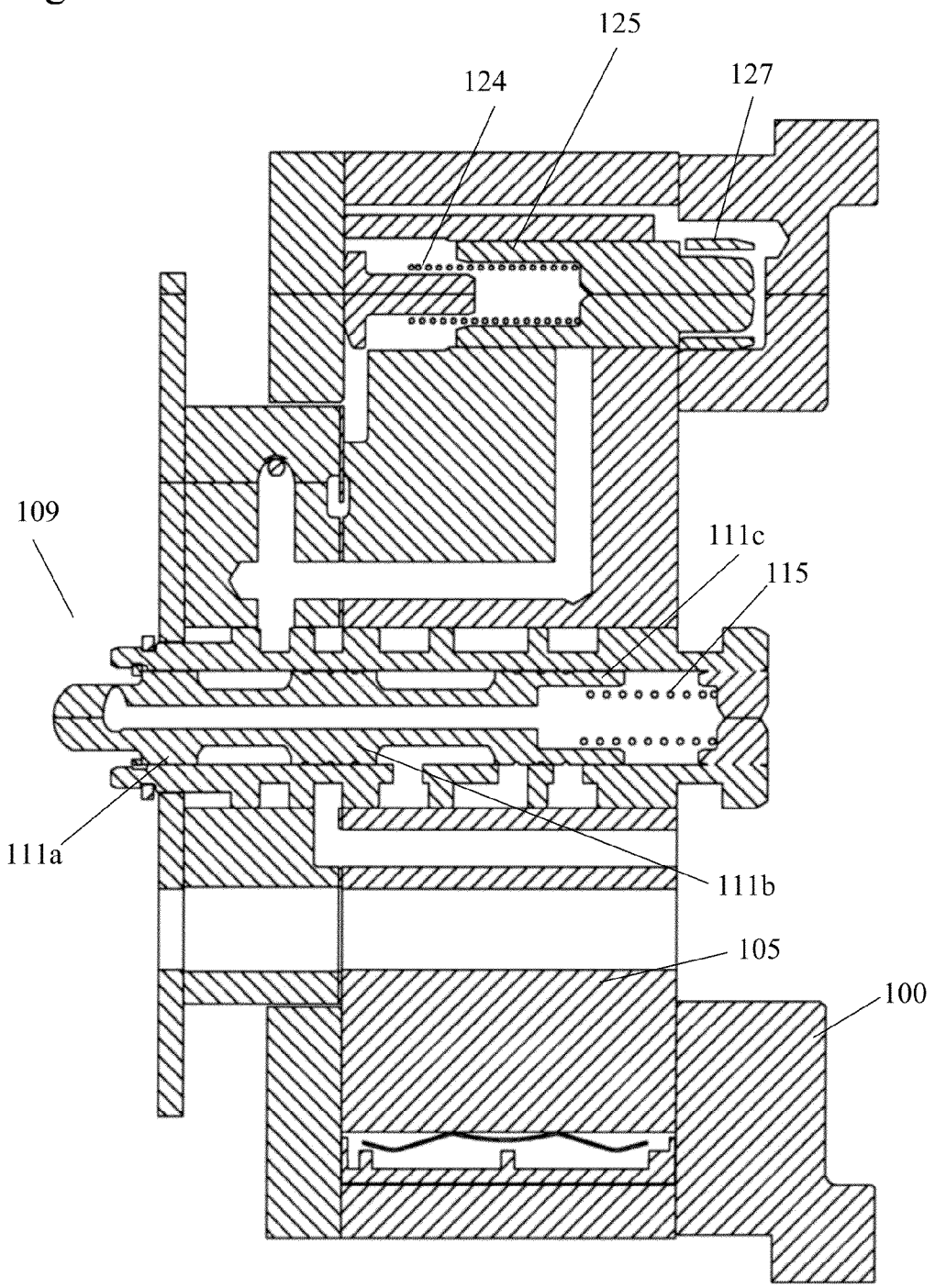
FIG. 11a shows a cross-section of the phaser with the lock pin locked.
Figure 11B:
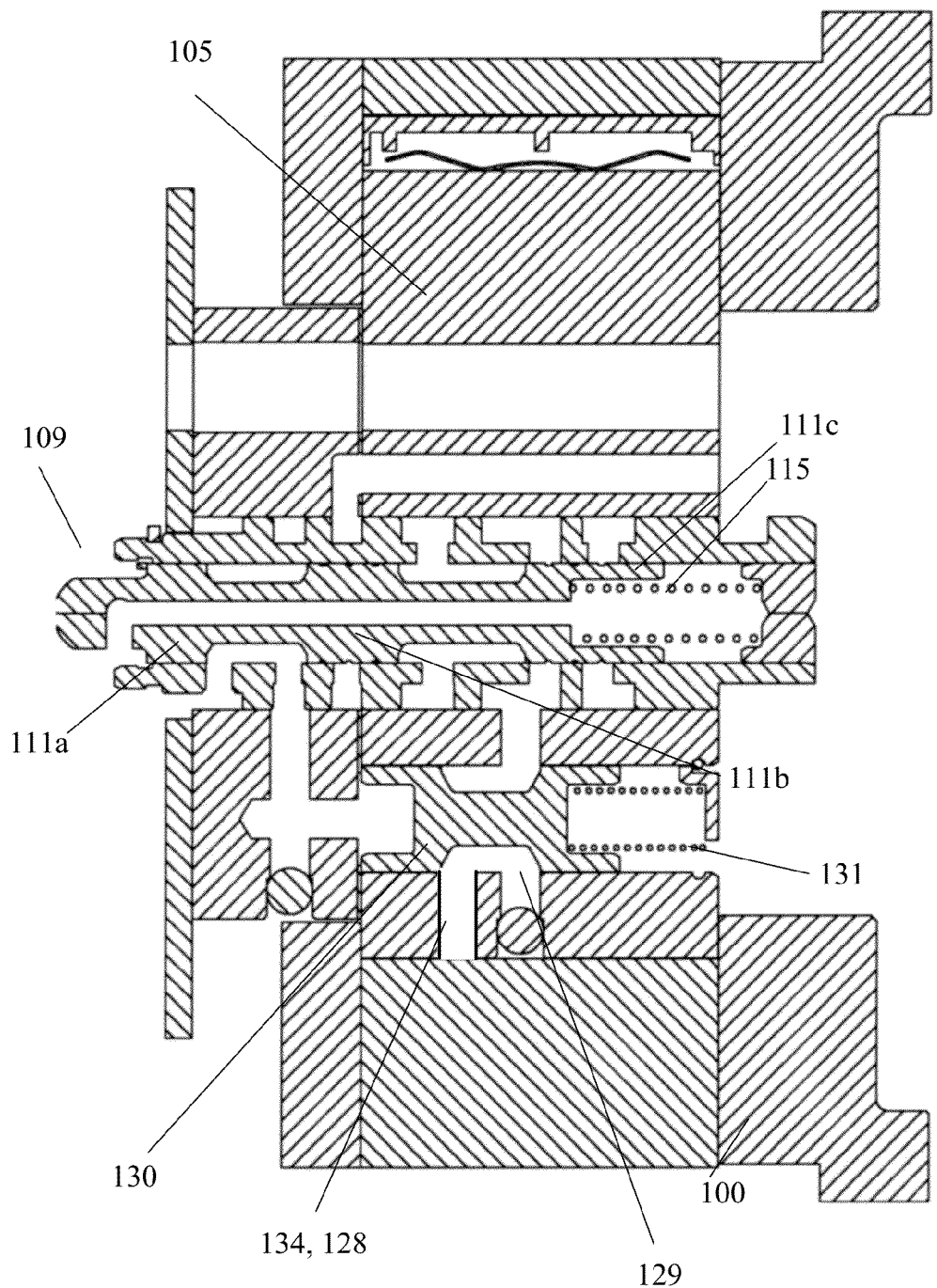
FIG. 11b shows a cross-section of the phaser with the piloted valve in a position such that the hydraulic detent circuit is on or open.

FIG. 6 shows the phaser in the holding position. In this position, the duty cycle of the variable force solenoid 107 is 60% and the force of the VFS 107 on one end of the spool 111 equals the force of the spring 115 on the opposite end of the spool 111 in holding mode. The lands 111a and 111b block the flow of fluid to lines 112 and 113 respectively. Makeup oil is supplied to the phaser from supply S by pump 121 to make up for leakage and enters line 119 through a bearing 120. Line 119 splits into two lines 119a and 119b. Line 119b leads to inlet check valve 118 and the control valve 109. From the control valve 109, fluid enters line 114 through either of the check valves 108, 110, depending on which is open to the chambers 102, 103. Line 119a leads to the lock pin 125 and branches into line 132 which leads to the piloted valve 130. The pressure of the fluid in line 119a moves through the spool 111 between lands 111b and 111c to bias the lock pin 125 against the spring 124 to a released position, filling the lock pin circuit 123. The fluid in line 119a also flows through line 132 and pressurizes the piloted valve 130 against the spring 131, moving the piloted valve 130 to a position where retard detent line 134 and advance detent line 128 are blocked from line 129 and from each other as shown in FIGS. 5 and 13 and the detent circuit 133 is off. Exhaust line 122 is blocked by spool land 111b, preventing the lock pin 125 and piloted valve 130 from venting.

When the duty cycle is set between 60-80%, the vane of the phaser is moving toward and/or in an advance position. The stroke of the spool or position of the spool relative to the sleeve is between 3.5 and 5 mm for the advance position.

Figure 4:
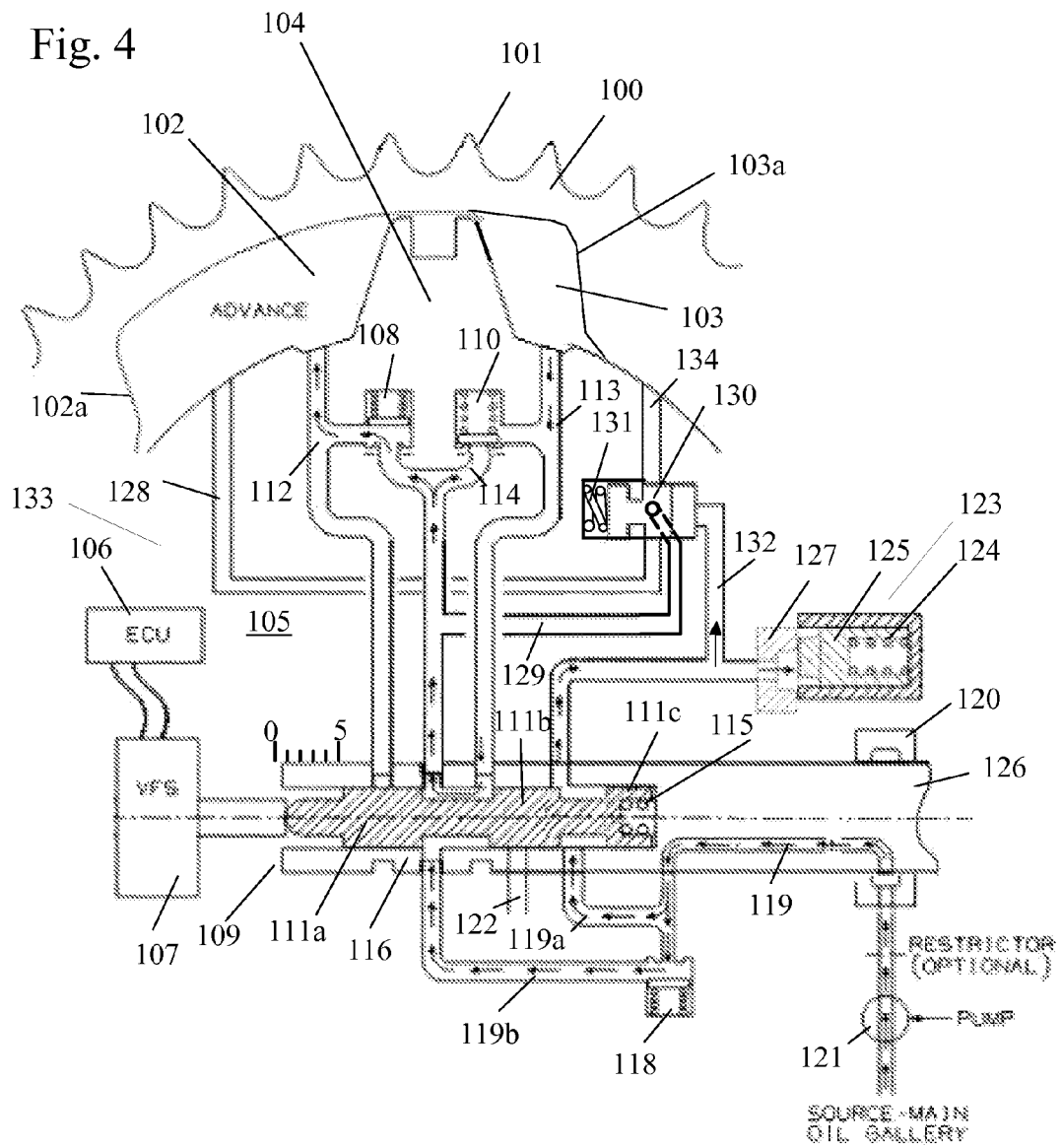
FIG. 4 shows a schematic of a cam torque mid-position lock phaser moving towards an advance position.

FIG. 4 shows the phaser moving towards the advance position. To move towards the advance position, the duty cycle is increased to greater than 60% and up to 100%, the force of the VFS 107 on the spool 111 is increased and the spool 111 is moved to the right by the VFS 107 in an advance mode, until the force of the spring 115 balances the force of the VFS 107.

In the advance mode shown, spool land 111a blocks line 112 and lines 113 and 114 are open. Camshaft torque pressurizes the retard chamber 103, causing fluid to move from the retard chamber 103 and into the advance chamber 102, and the vane 104 to move in the direction shown by the arrow. Fluid exits from the retard chamber 103 through line 113 to the control valve 109 between spool lands 111a and 111b and recirculates back to central line 114 and line 112 leading to the advance chamber 102.

Makeup oil is supplied to the phaser from supply S by pump 121 to make up for leakage and enters line 119 through a bearing 120. Line 119 splits into two lines 119a and 119b. Line 119b leads to an inlet check valve 118 and the control valve 109. From the control valve 109, fluid enters line 114 through either of the check valves 108,110, depending on which is open to the chambers 102, 103. Line 119a leads to the lock pin 125 and branches into line 132 which leads to the piloted valve 130. The pressure of the fluid in line 119a moves through the spool 111 between lands 111b and 111c to bias the lock pin 125 against the spring 124 to a released position, filling the lock pin circuit 123 with fluid. The fluid in line 119a also flows through line 132 and pressurizes the piloted valve 130 against the spring 131, moving the piloted valve 130 to a position where retard detent line 134, advance detent line 128 and line 129 are blocked as shown in FIGS. 1 and 10 and the detent circuit is off. Exhaust line 122 is blocked by spool land 111b, preventing the lock pin 125 from venting.

Figure 2:
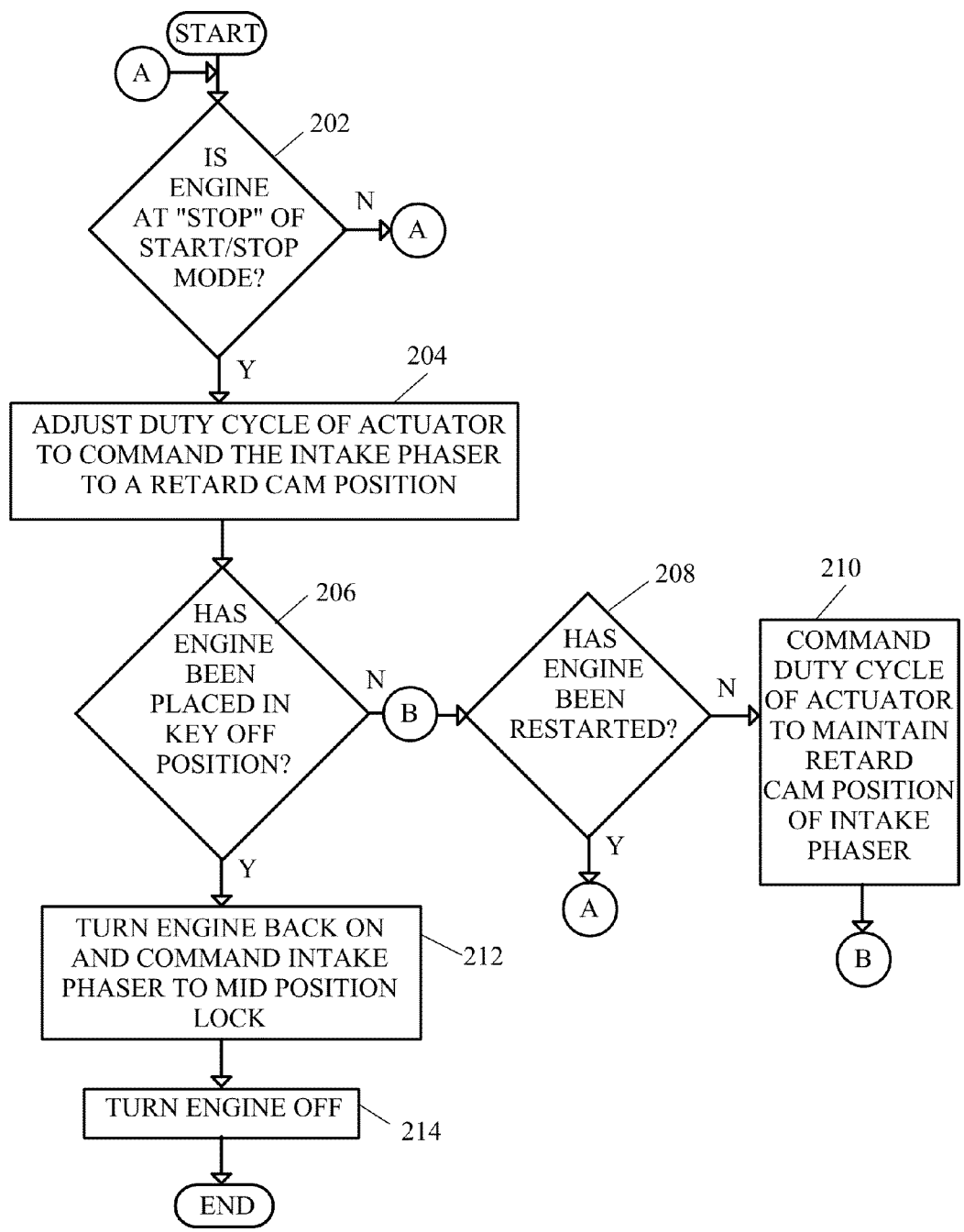
FIG. 2 shows a flowchart of a first embodiment for using a cam torque mid-position lock phaser for a warm restart during a stop-start mode of the engine.
Figure 3:
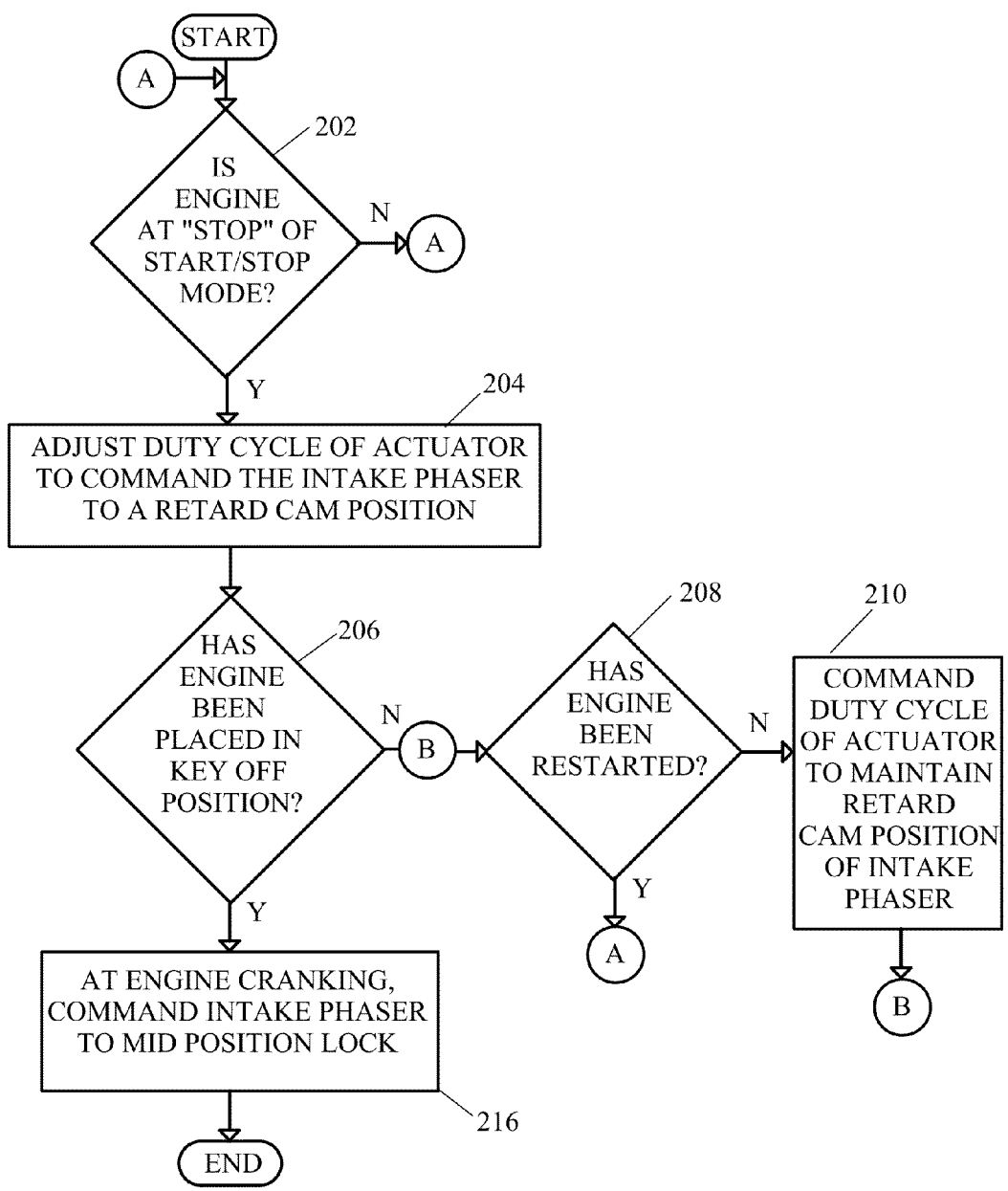
FIG. 3 shows a flowchart of a second embodiment for using a cam torque mid-position lock phaser for a warm restart during a stop-start mode of the engine.

FIGS. 2 and 3 show flowcharts of a method of operation of the mid-position lock phaser, when the user manually selects shut-down of the engine while the engine is in the shut down because of the automatic stop mode. The method of FIGS. 2 and 3 also show the method of operation of the mid-position lock phaser during the automatic stop mode, when the engine has not yet been restarted.

FIG. 2 shows a flowchart for a method of a first embodiment for using a mid-position lock phaser for an automatic warm or hot restart during a stop-start mode of the engine.

In a first step, if the engine is determined to be at an automatic stop of the stop-start mode of the engine (step 202), the ECU adjusts the duty cycle of the VFS to command the phaser to a retard position (step 204), for example as shown in FIG. 5. The automatic stop of the stop-start mode may be determined by the ECU based on engine parameters, sensor input and/or user actions such as depressing the brake.

If the engine has not been placed in a "key off" position or shutdown by the user (step 206), and the engine has not been automatically restarted (step 208), the ECU commands the VFS to maintain the phaser in the retard position (step 210) and returns to step 208 to determine if the engine has been automatically restarted, for example in response to a driver action, such as releasing the brake, and/or stepping on the gas. Additionally, it should be noted that the phaser is maintained in the full retard position through the positioning of the control valve, not through lock pins or dynamic/static frictional forces.

If the engine has been placed in a "key off" position or shutdown by the user (step 206), the ECU restarts the engine and commands the control valve through the VFS to the detent position (0% duty cycle) in which the lock pin locks the position of the phaser in an intermediate phase angle position (step 212) in preparation for the next start. For example, this is shown in FIGS. 8, 9, 10a, 10b, 13 with the phaser moving towards the intermediate phase angle position, and FIGS. 7a, 7b, 11a, 11b, 12 which show the phaser in the mid position or intermediate phase angle position.

After the lock pin locks the phaser in an intermediate phase angle position, the engine is shut down (step 214) and the method ends.

FIG. 3 shows a flowchart for a method of a second embodiment for using a cam torque mid-position lock phaser for an automatic warm or hot restart during a stop-start mode of the engine. The method of FIG. 3 differs from the method of FIG. 2 in that the commanding of the phaser to mid-position lock if the key is off is not done by restarting the engine, but rather waits until the next cranking of the engine to command mid-position lock.

In a first step, if the engine is determined to be at an automatic stop of the stop-start mode of the engine (step 202), the ECU adjusts the duty cycle of the VFS to command the phaser to a retard position (step 204), for example as shown in FIG. 5 and discussed above. The automatic stop of the stop-start mode may be determined by the ECU based on engine parameters, sensor input and/or user actions such as depressing the brake.

If the engine has not been placed in a "key off" position or shutdown by the user (step 206), and the engine has not be automatically restarted (step 208), the ECU commands the VFS to maintain the phaser in the retard position (step 210) and returns to step 108 to determine if the engine has been automatically restarted in response to a driver action, such as releasing the brake, and/or stepping on the gas. Additionally, it should be noted that the phaser is maintained in the full retard position through the position of the control valve, not through lock pins or dynamic/static frictional forces.

If the engine has been placed in a "key off" position or shutdown by the user (step 206), the ECU commands the control valve through the VFS to the detent position (0% duty cycle), in which the lock pin locks the position of the phaser in an intermediate phase angle position for cranking upon cold restart of the vehicle (step 216) and the method ends. Moving the phaser towards detent position and the phaser in detent position is shown in FIGS. 7a-13 and discussed above.

In step 204 of the above embodiments, the retard position can be replaced with any position other than a position in which the phaser is locked for example the detent position. The retard position can for example be replaced with an advanced position, or a holding position.

Figure 14:
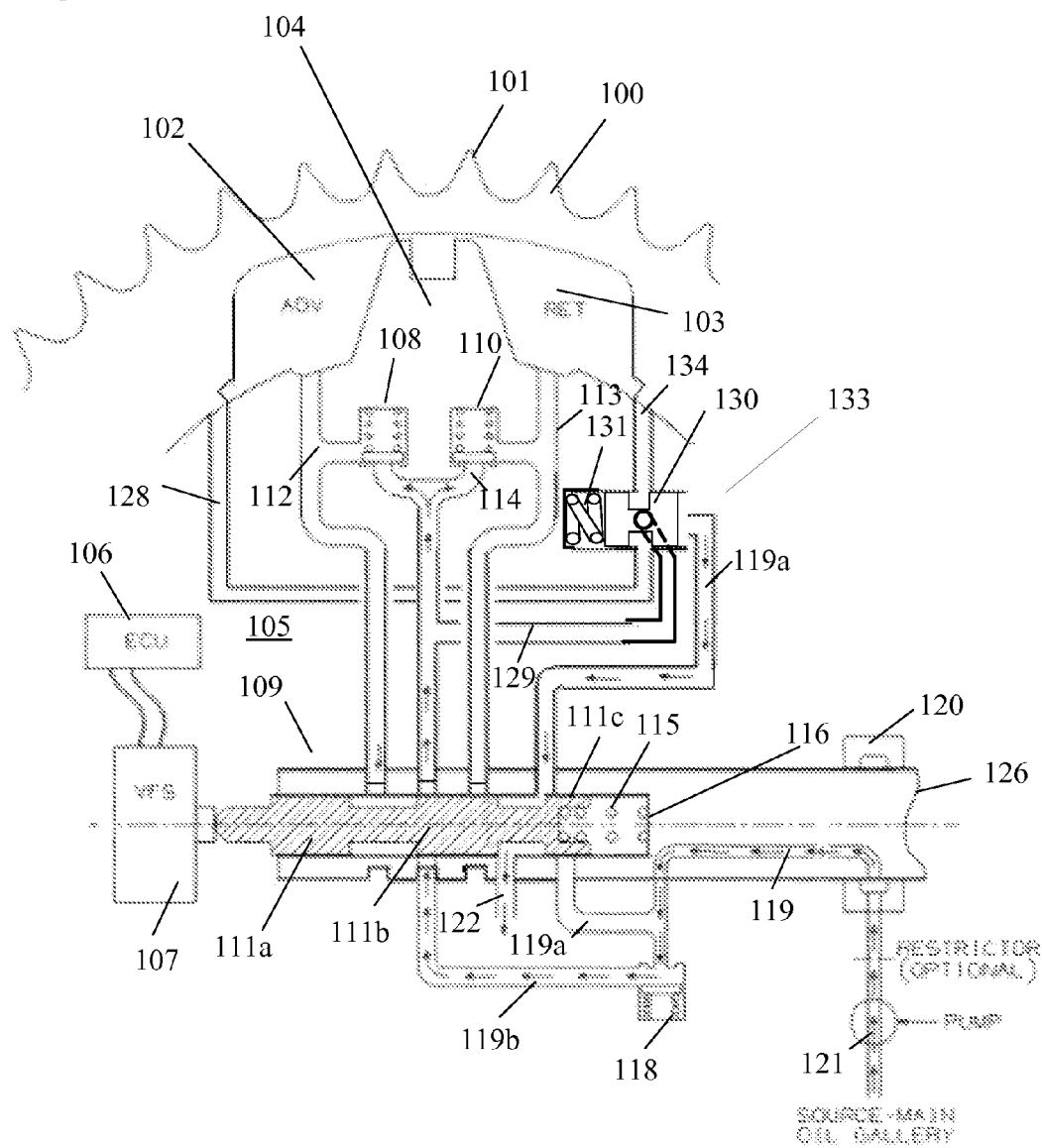
FIG. 14 shows a schematic of an alternate cam torque mid-position lock phaser with the piloted valve in a second position, the phaser in the intermediate phase angle position and the piloted valve controlled by supply through the control valve.

The methods of FIGS. 2 and 3 may apply to an alternate design of the mid-position lock phaser which uses a piloted valve 130 and hydraulic detent circuit 133 which are controlled and supplied with fluid through the control valve 109 of the phaser. Movement of the piloted valve is actively controlled by the control valve 109 of the phaser. FIG. 14 shows the control valve 109 in the detent mode and the hydraulic detent circuit 133 on. The advance mode, the retard mode, and the null mode are not shown, but are similar to FIGS. 4, 5, and 6, where the hydraulic detent circuit 133 is off. The hydraulic detent circuit 133 includes a spring 131 loaded piloted valve 130 and an advance detent line 128 that connects the advance chamber 102 to the piloted valve 130 and the common line 114, and a retard detent line 134 that connects the retard chamber 103 to the piloted valve 130 and the common line 114.

FIG. 14 shows the phaser in the mid position or intermediate phase angle position, where the duty cycle of the variable force solenoid is 0%, the spool 109 is in detent mode, the piloted valve 130 is vented through the spool to passage 122 leading to sump or exhaust, and the hydraulic detent circuit 133 is open or on.

Depending on where the vane 104 was prior to the duty cycle of the variable force solenoid 107 being changed to 0%, either the advance detent line 128 or the retard detent line 134 will be exposed to the advance or retard chamber 102, 103 respectively. In addition, if the engine had an abnormal shut down (e.g. the engine stalled), when the engine is cranking, the duty cycle of the variable force solenoid 107 would be 0% the rotor assembly 105 would move via the detent circuit to the mid position or intermediate phase angle position and the lock pin 125 would be engaged in mid position or intermediate phase angle position regardless of what position the vane 104 was in relative to the housing assembly 100 prior to the abnormal shut down of the engine. The ability of the phaser of the present invention to default to a mid position or intermediate phase angle position without using electronic controls allows the phaser to move to the mid position or intermediate phase angle position even during engine cranking when electronic controls are not typically used for controlling the cam phaser position. In addition, since the phaser defaults to the mid position or intermediate phase angle position, it provides a fail safe position, especially if control signals or power or lost, that guarantees that the engine will be able to start and run even without active control over the VCT phaser. Since the phaser has the mid position or intermediate phase angle position upon cranking of the engine, longer travel of the phase of the phaser is possible, providing calibration opportunities. In the prior art, longer travel phasers or a longer phase angle is not possible, since the mid position or intermediate phase angle position is not present upon engine cranking and startup and the engine has difficulty starting at either the extreme advance or retard stops.

Figure 12:
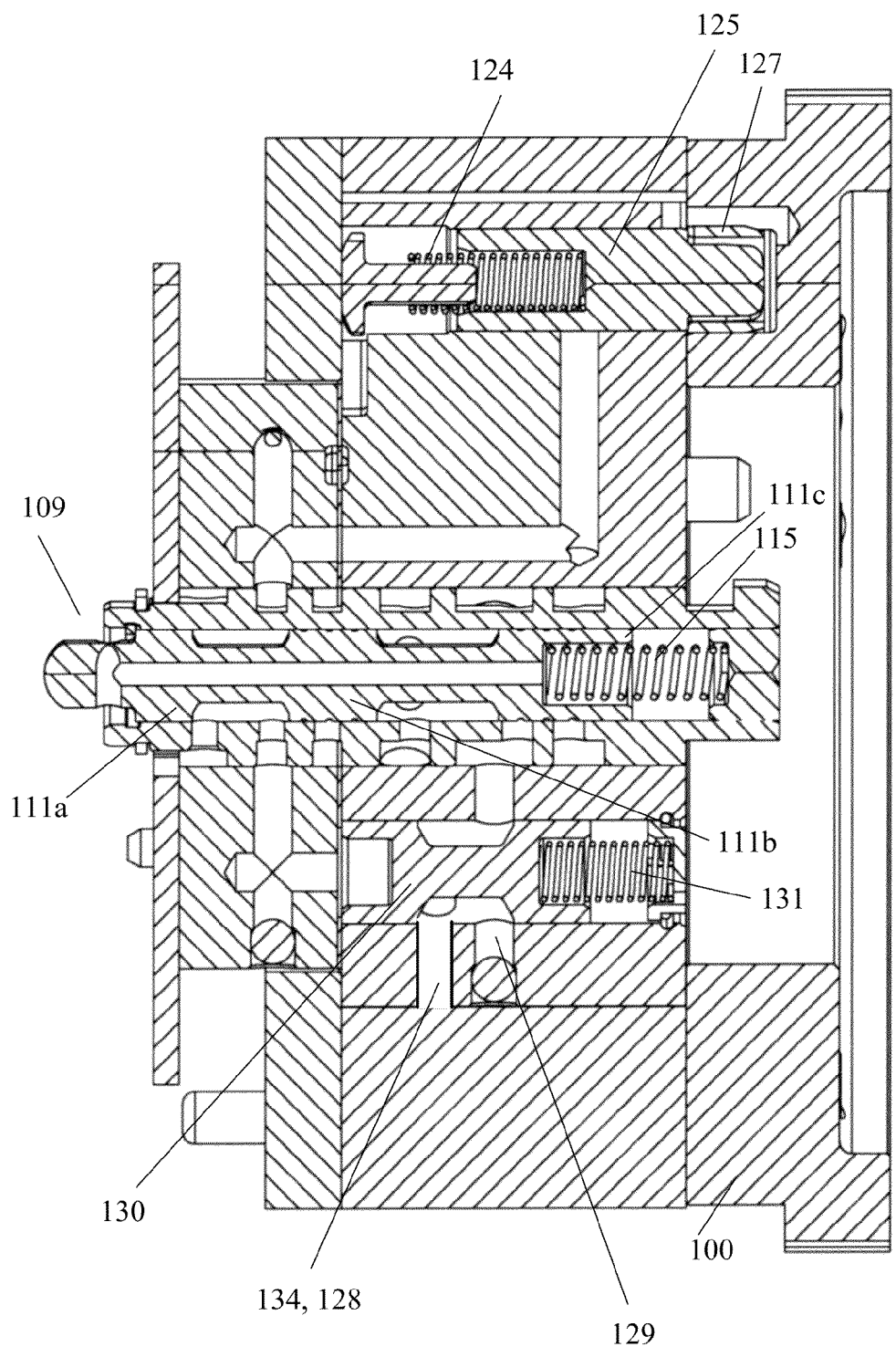
FIG. 12 shows an alternate cross-section of the phaser with the lock pin locked and the pilot valve in a position such that the hydraulic detent circuit is on or open.

When the duty cycle of the variable force solenoid 107 is just set to 0%, the force on the VFS on the spool 111 is decreased, and the spring 115 moves the spool 111 to the far left end of the spool's travel to a detent mode as shown in the FIG. 12. In the detent mode, spool land 111b blocks the flow of fluid from line 112 in between spool lands 111a and 111b from entering any of the other lines and line 113, effectively removing control of the phaser from the control valve 109. At the same time, fluid from supply may flow through line 119 to line 119b and inlet check valve 118 to the common line 114. Fluid is prevented from flowing through line 119a to the piloted valve 130 by spool land 111c. Since fluid cannot flow to line 119a, the piloted valve 130 vents to exhaust line 122, opening passage between the advance detent line 128 and the retard detent line 134 through the piloted valve 130 to line 129 and the common line 114, in other words, opening or turning on the hydraulic detent circuit 133.

If the vane 104 was positioned within the housing assembly 100 near or in the advance position and the advance detent line 128 is exposed to the advance chamber 102, then fluid from the advance chamber 102 will flow into the advance detent line 128 and through the open piloted valve 130 and to line 129 leading to common line 114. From the common line 114, fluid flows through check valve 110 and into the retard chamber 103, moving the vane 104 relative to the housing assembly 100 to close off or block advance detent line 128 to the advance chamber 102. As the rotor assembly 105 closes off the advance detent line 128 from the advance chamber 102, the vane 104 is moved to a mid position or intermediate phase angle position within the chamber formed between the housing assembly 100 and the rotor assembly 105.

If the vane 104 was positioned within the housing assembly 100 near or in the retard position and the retard detent line 134 is exposed to the retard chamber 103, then fluid from the retard chamber 103 will flow into the retard detent line 134 and through the open piloted valve 130 and to line 129 leading to common line 114. From the common line 114, fluid flows through check valve 108 and into the advance chamber 102, moving the vane 104 relative to the housing assembly 100 to close off the retard detent line 134 to the retard chamber 103. As the rotor assembly 105 closes off line the retard detent 134 from the retard chamber 103, the vane 104 is moved to a mid position or intermediate phase angle position within the chamber formed between the housing assembly 100 and the rotor assembly 105.

Figure 15:
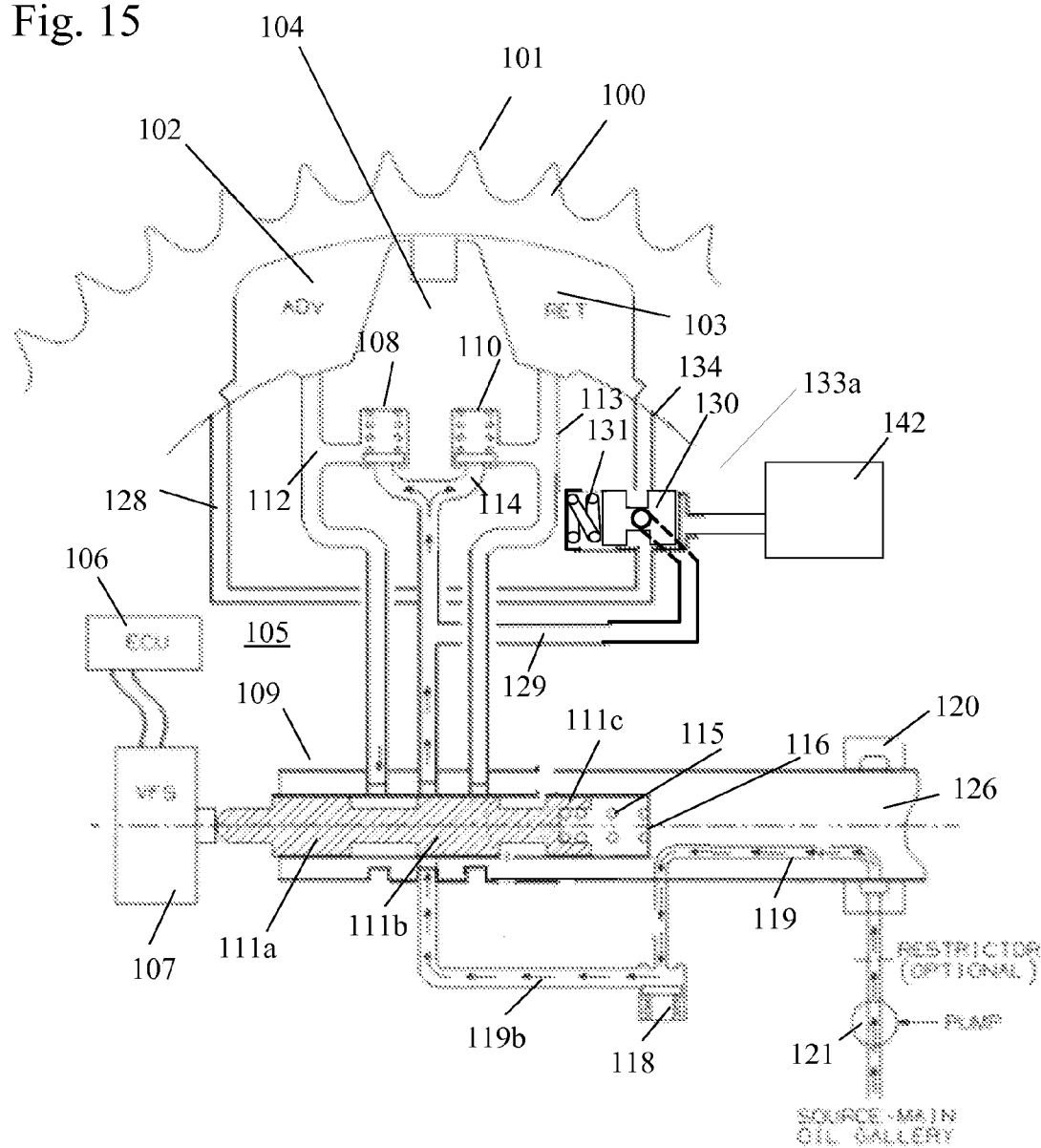
FIG. 15 shows a schematic of another alternate cam torque mid-position lock phaser with the piloted valve in a second position, the phaser in the intermediate phase angle position, and the piloted valve is controlled by other hydraulic means.

The methods of FIGS. 2 and 3 may also apply to an alternate phaser in which the piloted valve 130 and the hydraulic detent circuit 133a are controlled and supplied with fluid by remote means 142. The remote means 142 may be any on/off hydraulic valve, for example a solenoid valve. Movement of the piloted valve is actively controlled by the remote on/off valve. FIG. 15 shows the control valve in the detent mode and the hydraulic detent circuit on. The advance mode, the retard mode and the null mode are not shown, but are similar to FIGS. 4-6 discussed above, where the hydraulic detent circuit 133 is off. The hydraulic detent circuit 133a includes a spring 131 loaded piloted valve 130 and an advance detent line 128 that connects the advance chamber 102 to the piloted valve 130 and the common line 114, and a retard detent line 134 that connects the retard chamber 103 to the piloted valve 130, the common line 114 and line 144 connected to the remote means 142.

FIG. 15 shows the phaser in the mid position or intermediate phase angle position, where the duty cycle of the variable force solenoid is 0%, the spool 109 is in detent mode, the piloted valve 130 is vented through the hydraulic means 142 leading to exhaust, and the hydraulic detent circuit 133a is open.

Depending on where the vane 104 was prior to the duty cycle of the variable force solenoid 107 being changed to 0%, either the advance detent line 128 or the retard detent line 134 will be exposed to the advance or retard chamber 102, 103 respectively. In addition, if the engine had an abnormal shut down (e.g. the engine stalled), when the engine is cranking, the duty cycle of the variable force solenoid 107 would be 0% and the rotor assembly 105 will move via the detent circuit to the mid position or intermediate phase angle position and the lock pin 125 would be engaged in mid position or intermediate phase angle position regardless of what position the vane 104 was in relative to the housing assembly 100 prior to the abnormal shut down of the engine. With the ability of the phaser of the present invention to default to a mid position or intermediate phase angle position without using electronic controls, allows the phaser to move to the mid position or intermediate phase angle position even during engine cranking when electronic controls are not typically used for controlling the cam phaser position. In addition, since the phaser defaults to the mid position or intermediate phase angle position, it provides a fail safe position, especially if control signals or power or lost, that guarantees that the engine will be able to start and run even without active control over the VCT phaser. Since the phaser has the mid position or intermediate phase angle position upon cranking of the engine, longer travel of the phase of the phaser is possible, providing calibration opportunities. In the prior art, longer travel phasers or a longer phase angle is not possible, since the mid position or intermediate phase angle position is not present upon engine cranking and startup and the engine has difficulty starting at either the extreme advance or retard stops.

When the duty cycle of the variable force solenoid 107 is just set to 0%, the force on the VFS on the spool 111 is decreased, and the spring 115 moves the spool 111 to the far left end of the spool's travel to a detent mode as shown in the FIG. 14. In the detent mode, spool land 111b blocks the flow of fluid from line 112 in between spool lands 111a and 111b from entering any of the other lines and line 113, effectively removing control of the phaser from the control valve 109. At the same time, fluid from supply may flow through line 119 through the inlet check valve 118 to the common line 114. Fluid is prevented from flowing from the hydraulic means 142 through line 144 to the piloted valve 130 by the hydraulic means 142. In other words, the hydraulic means 142 would be switched off, and allowing venting of the fluid in line 144 only. Therefore, the piloted valve 130 vents to the hydraulic means 142 through line 144, opening passage between the advance detent line 128 and the retard detent line 134 through the piloted valve 130 to line 129 and the common line 114, in other words opening the hydraulic detent circuit 133a.

If the vane 104 was positioned within the housing assembly 100 near or in the advance position and the advance detent line 128 is exposed to the advance chamber 102, then fluid from the advance chamber 102 will flow into the advance detent line 128 and through the open piloted valve 130 and to line 129 leading to common line 114. From the common line 114, fluid flows through check valve 110 and into the retard chamber 103, moving the vane 104 relative to the housing assembly 100 to close off or block advance detent line 128 to the advance chamber 102. As the rotor assembly 105 closes off the advance detent line 128 from the advance chamber 102, the vane 104 is moved to a mid position or intermediate phase angle position within the chamber formed between the housing assembly 100 and the rotor assembly 105.

If the vane 104 was positioned within the housing assembly 100 near or in the retard position and the retard detent line 134 is exposed to the retard chamber 103, then fluid from the retard chamber 103 will flow into the retard detent line 134 and through the open piloted valve 130 and to line 129 leading to common line 114. From the common line 114, fluid flows through check valve 108 and into the advance chamber 102, moving the vane 104 relative to the housing assembly 100 to close off the retard detent line 134 to the retard chamber 103. As the rotor assembly 105 closes off line the retard detent 134 from the retard chamber 103, the vane 104 is moved to a mid position or intermediate phase angle position within the chamber formed between the housing assembly 100 and the rotor assembly 105.

Figure 16:
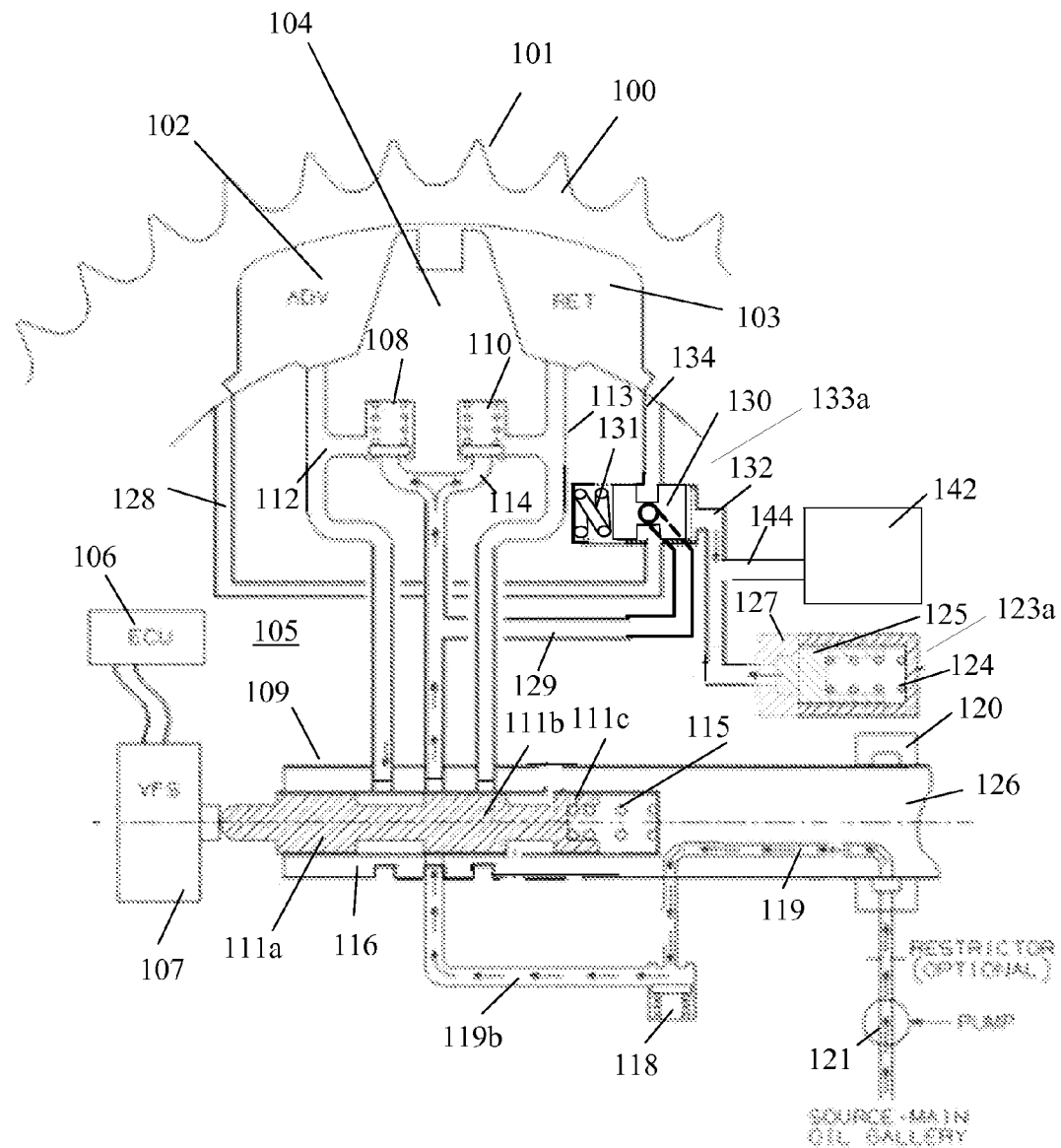
FIG. 16 shows a schematic of an alternate phaser with the piloted valve in a second position, the phaser in the intermediate phase angle position, and the lock pin and the piloted valve are controlled by other hydraulic means.

The methods of FIGS. 2 and 3 may apply to an alternate phaser in which the piloted valve 130, the hydraulic detent circuit 133 and the lock pin circuit 123 of the phaser are controlled by a remote means 142. The remote means 142 may be any on/off hydraulic valve, for example a solenoid valve. Movement of the piloted valve is actively controlled by the remote means. FIG. 16 shows the control valve 109 in the detent mode and the hydraulic detent circuit 133a on. The advance mode, the retard mode, and the null mode are not shown, but are similar to FIGS. 1-3 discussed above, where the hydraulic detent circuit is off. The hydraulic detent circuit 133a includes a spring 131 loaded piloted valve 130 and an advance detent line 128 that connects the advance chamber 102 to the piloted valve 130 and the common line 114, and a retard detent line 134 that connects the retard chamber 103 to the piloted valve 130, the common line 114, and line 144 leading to the hydraulic means 142. In this embodiment, the lock pin circuit 123a includes the lock pin 125, line 132 connecting the lock pin to the piloted valve and line 144 leading to the hydraulic means 142.

FIG. 16 shows the phaser in the mid position or intermediate phase angle position, where the duty cycle of the variable force solenoid is 0%, the spool 109 is in detent mode, the piloted valve 130 and the lock pin 125 are vented through the hydraulic means 142 leading to exhaust, and the hydraulic detent circuit 133a is open.

Depending on where the vane 104 was prior to the duty cycle of the variable force solenoid 107 being changed to 0%, either the advance detent line 128 or the retard detent line 134 will be exposed to the advance or retard chamber 102, 103 respectively. In addition, if the engine had an abnormal shut down (e.g. the engine stalled), when the engine is cranking, the duty cycle of the variable force solenoid 107 would be 0% and the rotor assembly 105 will move via the detent circuit to the mid position or intermediate phase angle position and the lock pin 125 would be engaged in mid position or intermediate phase angle position regardless of what position the vane 104 was in relative to the housing assembly 100 prior to the abnormal shut down of the engine. With the ability of the phaser of the present invention to default to a mid position or intermediate phase angle position without using electronic controls, allows the phaser to move to the mid position or intermediate phase angle position even during engine cranking when electronic controls are not typically used for controlling the cam phaser position. In addition, since the phaser defaults to the mid position or intermediate phase angle position, it provides a fail safe position, especially if control signals or power or lost, that guarantees that the engine will be able to start and run even without active control over the VCT phaser. Since the phaser has the mid position or intermediate phase angle position upon cranking of the engine, longer travel of the phase of the phaser is possible, providing calibration opportunities. In the prior art, longer travel phasers or a longer phase angle is not possible, since the mid position or intermediate phase angle position is not present upon engine cranking and startup and the engine has difficulty starting at either the extreme advance or retard stops.

When the duty cycle of the variable force solenoid 107 is just set to 0%, the force on the VFS on the spool 111 is decreased, and the spring 115 moves the spool 111 to the far left end of the spool's travel to a detent mode as shown in the FIG. 16. In the detent mode, spool land 111b blocks the flow of fluid from line 112 in between spool lands 111a and 111b from entering any of the other lines and line 113, effectively removing control of the phaser from the control valve 109. At the same time, fluid from supply may flow through line 119 to the inlet check valve 118 to the common line 114. Fluid is prevented from flowing from the hydraulic means 142 through line 144 and 132 to the piloted valve 130 and the lock pin 125 by the hydraulic means 142. In other words, the hydraulic means 142 would be switched off, and allowing venting only. Therefore, the piloted valve 130 and the lock pin 125 vents to the hydraulic means through lines 144 and 132, opening passage between the advance detent line 128 and the retard detent line 134 through the piloted valve 130 to line 129 and the common line 114, in other words opening the hydraulic detent circuit 133a.

If the vane 104 was positioned within the housing assembly 100 near or in the advance position and the advance detent line 128 is exposed to the advance chamber 102, then fluid from the advance chamber 102 will flow into the advance detent line 128 and through the open piloted valve 130 and to line 129 leading to common line 114. From the common line 114, fluid flows through check valve 110 and into the retard chamber 103, moving the vane 104 relative to the housing assembly 100 to close off or block advance detent line 128 to the advance chamber 102. As the rotor 105 closes off the advance detent line 128 from the advance chamber 102, the vane 104 is moved to a mid position within the chamber formed between the housing assembly 100 and the rotor 105, and the lock pin 125 aligns with recess 127, locking the rotor assembly 105 relative to the housing assembly 100 in a mid position or an intermediate phase angle position.

If the vane 104 was positioned within the housing assembly 100 near or in the retard position and the retard detent line 134 is exposed to the retard chamber 103, then fluid from the retard chamber 103 will flow into the retard detent line 134 and through the open piloted valve 130 and to line 129 leading to common line 114. From the common line 114, fluid flows through check valve 108 and into the advance chamber 102, moving the vane 104 relative to the housing assembly 100 to close off the retard detent line 134 to the retard chamber 103. As the rotor 105 closes off line the retard detent 134 from the retard chamber 103, the vane 104 is moved to an intermediate phase angle position or a mid position within the chamber formed between the housing assembly 100 and the rotor assembly 105, and the lock pin 125 aligns with the recess 127, locking the rotor 105 relative to the housing assembly 100 in a mid position or an intermediate phase angle position.

The phaser shown in the above Figures may also include a restrictor between the supply pump 121 and the supply line 119 entering the camshaft 126.

The methods of FIGS. 2 and 3 may apply to an alternate phaser that has a lock pin integrated into the piloted valve to form a piloted lock valve. Movement of the piloted lock valve is actively controlled by the control valve of the phaser.

Figure 17:
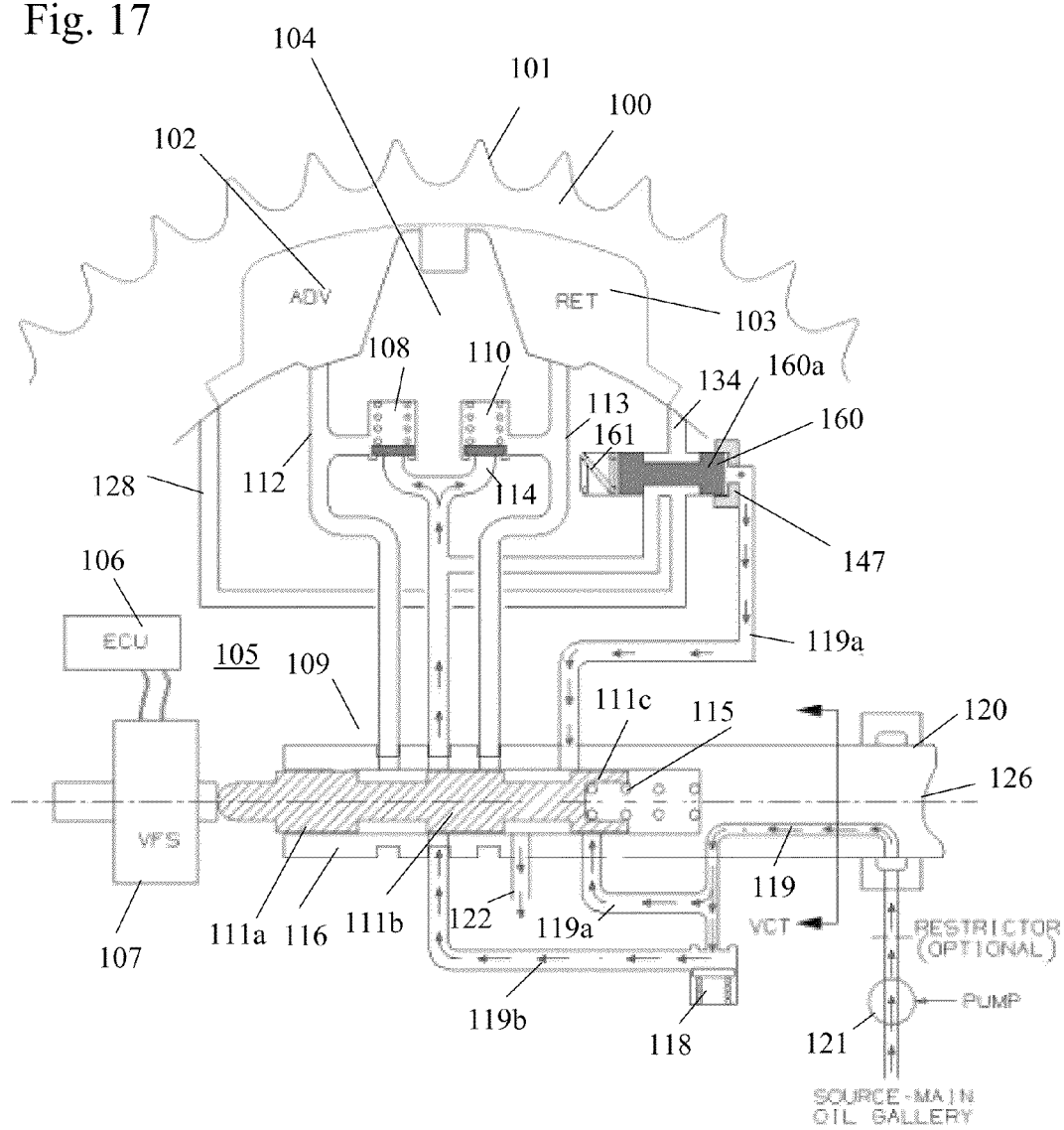
FIG. 17 shows a schematic of an alternate phaser in which a lock pin is integrated into the piloted valve and the hydraulic detent lock circuit is open and the lock pin end portion is engaged with the recess.

FIG. 17 shows the phaser in the mid position or intermediate phase angle position with lock pin end of the piloted lock valve engaging the recess.

The hydraulic detent lock circuit 162 includes a spring 161 loaded piloted lock valve 160 and an advance detent line 128 that connects the advance chamber 102 to the piloted lock valve 160 and the common line 114, a retard detent line 134 that connects the retard chamber 103 to the piloted lock valve 160 and the common line 114, and line 129 that connects the piloted lock valve 160 to the common line 114. The advance detent line 128 and the retard detent line 134 are a predetermined distance or length from the vane 104. The piloted lock valve 160 is in the rotor assembly 105 and is fluidly connected to line 119a and exhaust line 122. The piloted lock valve 160 also has an end that functions as a lock pin. One end portion of the valve 160 is the lock pin end portion 160a and is biased towards and fits into a recess 147 in the housing assembly 100 by spring 161. Alternatively, the piloted lock valve 160 may be housed in the housing assembly 100 and be spring 161 biased towards a recess 147 in the rotor assembly 105. The opening and closing of the hydraulic detent lock circuit 162 is controlled by the switching/movement of the phase control valve 109.

FIG. 17 shows the phaser in detent mode with the lock pin end portion 160a of the piloted lock valve 160 engaged with the recess 147. In this position, the duty cycle of the variable force solenoid 107 is 0% and the force of the VFS 107 on one end of the spool 111 equals the force of the spring 115 on the opposite end of the spool 111 in detent mode. Land 111b blocks the flow of fluid to and from lines 113 and 114. Makeup oil is supplied to the phaser from supply S by pump 121 to make up for leakage and enters line 119 through a bearing 120. Line 119 splits into two lines 119a and 119b. Line 119b leads to inlet check valve 118 and the control valve 109. From line 119b, fluid enters an annulus in the outer diameter of the sleeve of the control valve and enters line 114 through either of the check valves 108, 110, depending on which is open to the chambers 102, 103. Line 119a leads to the lock pin end portion 160a of the piloted lock valve 160. Fluid in line 112 is blocked by the spool 111 and the lands 111a and 111b from exiting the control valve 109 and the advance chamber 102. Fluid in line 119a vents from the piloted lock valve 160 through line 119a and between lands 111b and 111c to line 122 leading to sump. By venting the fluid in line 119a, the force of the spring 161 on the piloted lock valve 160 moves the valve such that the lock pin end portion 160a engages the recess 147.

The variable force solenoid in the above embodiments may be replaced with a stepper motor, or non-variable solenoid.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of using a variable cam timing phaser in an internal combustion engine with a stop-start mode of operation, in which the phaser comprises:
    a housing assembly with an outer circumference for accepting drive force and a rotor assembly for connection to a camshaft, coaxially located within the housing having a plurality of vanes, wherein the housing assembly and the rotor assembly define at least one chamber separated by a vane into an advance chamber and a retard chamber, the vane within the chamber acting to shift relative angular position of the housing assembly and the rotor assembly;
    a control valve for directing fluid to and from the chambers through an advance line, a retard line, a common line, an advance detent line and a retard detent line, the control valve being movable in a first bore towards an advance mode, a holding position, a retard mode, and a detent mode,
    a lock pin slidably located in the rotor assembly or the housing assembly, the lock pin being moveable in the second bore from a locked position in which an end portion engages the recess, locking the relative angular position of the housing assembly and the rotor assembly, to an unlocked position, in which the end portion does not engage the recess;
    a piloted valve in the rotor assembly, movable from a first position to a second position;
    the method comprising the steps of, when the engine is in a stop mode of the stop-start mode:
    adjusting a duty cycle of an actuator coupled to the control valve of the phaser to command the control valve to the retard mode;
    maintaining the duty cycle of the actuator to command the control valve to remain in the retard mode until an automatic restart of the engine;
    detecting if the key is in an off position, and if the key is in an off position, performing the steps of:
        restarting the engine;
        commanding the phaser to the detent mode, such that the lock pin is moved to a locked position and the phaser is locked in an intermediate phase angle position; and
        shutting down the engine.

2. The method of claim 1, wherein when the piloted valve is in the first position, fluid is blocked from flowing through the piloted valve and wherein when the piloted valve is in a second position, fluid is allowed to flow between the advance detent line from the advance chamber and the retard detent line from the retard chamber through the piloted valve and a common line, such that the rotor is moved to and held in the intermediate phase angle position relative to the housing.

3. The method of claim 1, wherein when the control valve is commanded to the detent mode, the piloted valve is moved to the second position, the advance detent line or the retard detent line are in fluid communication with the common line through the piloted valve, the rotor assembly is moved to and held in an intermediate phase angle position relative to the housing assembly.

4. The method of claim 1, wherein the piloted valve is moved to the first position by hydraulic pressure.

5. The method of claim 4, wherein the hydraulic pressure is controlled by a remote on/off valve.

6. The method of claim 4, wherein the hydraulic pressure is controlled by a control valve for the phaser.

7. The method of claim 1, wherein the piloted valve is spring biased to the second position.

8. The method of claim 1, wherein the actuator is a variable force solenoid.

9. The method of claim 1, wherein the lock pin is integrally formed with the pilot valve.

10. A method for using a variable cam timing phaser in an internal combustion engine with a stop-start mode of operation, in which the phaser comprises:
  a housing assembly with an outer circumference for accepting drive force and a rotor assembly for connection to a camshaft, coaxially located within the housing having a plurality of vanes, wherein the housing assembly and the rotor assembly define at least one chamber separated by a vane into an advance chamber and a retard chamber, the vane within the chamber acting to shift relative angular position of the housing assembly and the rotor assembly;
  a control valve for directing fluid to and from the chambers through an advance line, a retard line, a common line, an advance detent line and a retard detent line, the control valve being movable in a first bore towards an advance mode, a holding position, a retard mode, and a detent mode;
  a lock pin slidably located in the rotor assembly or the housing assembly, the lock pin being moveable in the second bore from a locked position in which an end portion engages the recess, locking the relative angular position of the housing assembly and the rotor assembly, to an unlocked position, in which the end portion does not engage the recess;
  a piloted valve in the rotor assembly, movable from a first position to a second position;
  the method comprising the steps of, when the engine is in a stop mode of the stop-start mode:
  adjusting a duty cycle of an actuator coupled to the control valve of the phaser to command the control valve to the retard mode;
  maintaining the duty cycle of the actuator to command the control valve to remain in the retard mode until an automatic restart of the engine;
  detecting if the key is in an off position, and if the key is in an off position, performing the steps of:
    commanding the phaser to detent mode during engine cranking during a next engine restart, such that the lock pin is moved to a locked position and the phaser is locked in an intermediate phase angle position.

11. The method of claim 10, wherein when the piloted valve is in the first position, fluid is blocked from flowing through the piloted valve and wherein when the piloted valve is in a second position, fluid is allowed to flow between the advance detent line from the advance chamber and the retard detent line from the retard chamber through the piloted valve and a common line, such that the rotor is moved to and held in the intermediate phase angle position relative to the housing.

12. The method of claim 10, wherein when the control valve is commanded to the detent mode, the piloted valve is moved to the second position, the advance detent line or the retard detent line are in fluid communication with the common line through the piloted valve, the rotor assembly is moved to and held in an intermediate phase angle position relative to the housing assembly.

13. The method of claim 10, wherein the piloted valve is moved to the first position by hydraulic pressure.

14. The method of claim 13, wherein the hydraulic pressure is controlled by a remote on/off valve.

15. The method of claim 13, wherein the hydraulic pressure is controlled by a control valve for the phaser.

16. The method of claim 10, wherein the piloted valve is spring biased to the second position.

17. The method of claim 10, wherein the actuator is a variable force solenoid.

18. The method of claim 10, wherein the lock pin is integrally formed with the pilot valve.

19. A method of using a variable cam timing phaser in an internal combustion engine with a stop-start mode of operation, in which the phaser comprises:
  a housing assembly with an outer circumference for accepting drive force and a rotor assembly for connection to a camshaft, coaxially located within the housing having a plurality of vanes, wherein the housing assembly and the rotor assembly define at least one chamber separated by a vane into an advance chamber and a retard chamber, the vane within the chamber acting to shift relative angular position of the housing assembly and the rotor assembly;
  a control valve for directing fluid to and from the chambers through an advance line, a retard line, a common line, an advance detent line and a retard detent line, the control valve being movable in a first bore towards an advance mode, a holding position, a retard mode, and a detent mode,
  a lock pin slidably located in the rotor assembly or the housing assembly, the lock pin being moveable in the second bore from a locked position in which an end portion engages the recess, locking the relative angular position of the housing assembly and the rotor assembly, to an unlocked position, in which the end portion does not engage the recess;
  a piloted valve in the rotor assembly, movable from a first position to a second position;
  the method comprising the steps of, when the engine is in a stop mode of the stop-start mode:
  adjusting a duty cycle of an actuator coupled to the control valve of the phaser to command the control valve to a position other than the detent mode;
  maintaining the duty cycle of the actuator to command the control valve to remain in the position other than the detent mode until an automatic restart of the engine;
  detecting if the key is in an off position, and if the key is in an off position, performing the steps of:
    restarting the engine;
    commanding the phaser to the detent mode, such that the lock pin is moved to a locked position and the phaser is locked in an intermediate phase angle position; and
    shutting down the engine.

20. The method of claim 19, wherein when the piloted valve is in the first position, fluid is blocked from flowing through the piloted valve and wherein when the piloted valve is in a second position, fluid is allowed to flow between the advance detent line from the advance chamber and the retard detent line from the retard chamber through the piloted valve and a common line, such that the rotor is moved to and held in the intermediate phase angle position relative to the housing.

21. The method of claim 19, wherein when the control valve is commanded to the detent mode, the piloted valve is moved to the second position, the advance detent line or the retard detent line are in fluid communication with the common line through the piloted valve, the rotor assembly is moved to and held in an intermediate phase angle position relative to the housing assembly.

22. The method of claim 19, wherein the piloted valve is moved to the first position by hydraulic pressure.

23. The method of claim 22, wherein the hydraulic pressure is controlled by a remote on/off valve.

24. The method of claim 22, wherein the hydraulic pressure is controlled by a control valve for the phaser.

25. The method of claim 19, wherein the piloted valve is spring biased to the second position.

26. The method of claim 19, wherein the actuator is a variable force solenoid.

27. The method of claim 19, wherein the lock pin is integrally formed with the pilot valve.

28. The method of claim 19, wherein the position other than the detent mode is a retard position.

29. The method of claim 19, wherein the position other than the detent mode is an advanced position.

* * * * *